United States Patent
Lei et al.

(10) Patent No.: US 11,985,081 B2
(45) Date of Patent: *May 14, 2024

(54) POWER SAVINGS FOR REDUCED CAPABILITY DEVICES

(71) Applicant: QUALCOMM Incorporated, San Diego, CA (US)

(72) Inventors: Jing Lei, San Diego, CA (US); Qunfeng He, San Diego, CA (US); Muhammad Nazmul Islam, Littleton, MA (US); Linhai He, San Diego, CA (US); Peter Gaal, San Diego, CA (US); Hari Sankar, San Diego, CA (US); Carsten Aagaard Pedersen, Bolton, MA (US); Murali Menon, Acton, MA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/658,702

(22) Filed: Apr. 11, 2022

(65) Prior Publication Data

US 2022/0360381 A1    Nov. 10, 2022

Related U.S. Application Data

(63) Continuation of application No. 17/655,333, filed on Mar. 17, 2022, now Pat. No. 11,563,535.

(Continued)

(51) Int. Cl.
*H04L 5/00* (2006.01)

(52) U.S. Cl.
CPC .......... *H04L 5/0032* (2013.01); *H04L 5/0053* (2013.01)

(58) Field of Classification Search
CPC .......................... H04L 5/0032; H04L 5/0053
See application file for complete search history.

(56) References Cited

U.S. PATENT DOCUMENTS

| | | | |
|---|---|---|---|
| 2021/0184824 A1 | 6/2021 | Kwak et al. | |
| 2022/0046612 A1 | 2/2022 | Ma et al. | |

(Continued)

FOREIGN PATENT DOCUMENTS

| | | | |
|---|---|---|---|
| CN | 112640546 A | 4/2021 | |
| CN | 113424593 A | 9/2021 | |

(Continued)

OTHER PUBLICATIONS

International Search Report and Written Opinion—PCT/US2022/072133—ISA/EPO—dated Sep. 21, 2022.

(Continued)

*Primary Examiner* — Melvin C Marcelo
(74) *Attorney, Agent, or Firm* — Patterson + Sheridan, LLP

(57) ABSTRACT

Certain aspects of the present disclosure provide techniques for power savings for reduced capability devices. A method that may be performed by a user equipment (UE) includes receiving a shared bandwidth part (BWP) configuration and a group common BWP configuration. The group common BWP configuration indicates a group common BWP shared by a group of UEs, including the UE, having one or more common capabilities or a common UE type. The method includes communicating using the group common BWP based on the group common BWP configuration.

56 Claims, 15 Drawing Sheets

Related U.S. Application Data

(60) Provisional application No. 63/186,568, filed on May 10, 2021.

(56) References Cited

U.S. PATENT DOCUMENTS

2022/0104109 A1  3/2022  Lei et al.
2022/0360380 A1  11/2022  Lei et al.

FOREIGN PATENT DOCUMENTS

WO   2020229066 A1   11/2020
WO   2021230729 A1   11/2021
WO   2022031062 A1   2/2022

OTHER PUBLICATIONS

Nokia, et al., "Basic Functions for Broadcast I Multicast for RRC_Idle I RRC_Inactive UEs", 3GPP TSG RAN WG1 Meeting #104-e, R1-2100512, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, XP051970425, section 2.1, figures 2,3.

OPPO: "Discussion on UE Complexity Reduction", 3GPP TSG RAN WG1 #104-e, R1-2101777, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 25, 2021, XP051975879, 10 Pages, section 2.2.1 and 2.3, figures 1,2.

Qualcomm Incorporated: "Complexity Reduction for RedCap Devices", 3GPP TSG-RAN WG1 Meeting #104, R1-2101766, 3GPP, Mobile Competence Centre, 650, Route Des Lucioles, F-06921 Sophia-Antipolis Cedex, France, vol. RAN WG1, No. e-Meeting, Jan. 25, 2021-Feb. 5, 2021, 13 Pages, Feb. 5, 2021, XP051975869, clause 2.1 with reference to Fig. 2, section 4.1, section 2.2.1 and 2.3, figures 1,2.

Kumagai S., "[109-e-R17-UE-Features-RedCap-01] Email Discussion on UE Features for RedCap", 3GPP_TSG_RAN_WG1 Archives, May 13, 2022, pp. 1-15.

POWER SAVINGS FOR REDUCED CAPABILITY DEVICES

CROSS-REFERENCE TO RELATED APPLICATION(S)

This application is a continuation of U.S. patent application Ser. No. 17/655,333, filed Mar. 17, 2022, which claims the benefit of and priority to U.S. Provisional Application No. 63/186,568, filed May 10, 2021, both of which are hereby assigned to the assignee hereof and hereby expressly incorporated by reference herein in their entirety as if fully set forth below and for all applicable purposes.

INTRODUCTION

Aspects of the present disclosure relate to wireless communications, and more particularly, to techniques for reduced capability devices.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for wireless communication performed by a user equipment (UE). The method generally includes receiving, from a network entity, a group common bandwidth part (BWP) configuration indicating a group common BWP shared by a group of UEs including the UE. The method generally includes receiving signaling indicating a BWP switch to the group common BWP. The method generally includes switching to the group common BWP based on the signaling.

Certain aspects can be implemented in another method for wireless communication performed by a UE. The method generally includes receiving, from a network entity, a measurement object configuration and a group common reference signal (RS) configuration indicating one or more group common RSs shared by a group of UEs including the UE. The method generally includes monitoring the one or more group common RSs based on the measurement object configuration and the group common RS configuration.

Certain aspects can be implemented in yet another method for wireless communication performed by a UE. The method generally includes receiving a shared BWP configuration and a group common BWP configuration. The group common BWP configuration indicates a group common BWP shared by a group of UEs, including the UE, having one or more common capabilities or a common UE type. The shared BWP configuration indicates a shared BWP different than the group common BWP. The method generally includes communicating using the group common BWP based on the group common BWP configuration.

Certain aspects can be implemented in yet another method for wireless communication performed by a UE. The method generally includes receiving a group common RS configuration. The group common RS configuration indicates one or more group common RSs shared by a group of UEs including the UE. The method generally includes monitoring the one or more group common RSs based on the group common RS configuration.

Certain aspects can be implemented in a method for wireless communication performed by a base station (BS). The method generally includes sending, to a UE, a group common BWP configuration indicating a group common BWP shared by a group of UEs including the UE. The method generally includes sending signaling, to the UE, indicating a BWP switch to the group common BWP. The method generally includes communicating with the UE in the group common BWP.

Certain aspects can be implemented in another method for wireless communication performed by a BS. The method generally includes sending, to a UE, a measurement object configuration and a group common RS configuration indicating one or more group common RSs shared by a group of UEs including the UE. The method generally includes transmitting the one or more group common RSs to the UE.

Certain aspects can be implemented in a method for wireless communication performed by a network entity. The method generally includes outputting a shared BWP configuration and a group common BWP configuration. The group common BWP configuration indicates a group common BWP shared by a group of UEs having one or more common capabilities or a common UE type. The shared BWP configuration indicates a shared BWP different than the group common BWP. The method generally includes communicating using the group common BWP based on the group common BWP configuration.

Certain aspects can be implemented in yet another method for wireless communication performed by a network entity. The method generally includes outputting a group common RS configuration. The group common RS configuration indicates one or more group common RSs shared by a group of UEs. The method generally includes outputting the one or more group common RSs based on the group common RS configuration.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
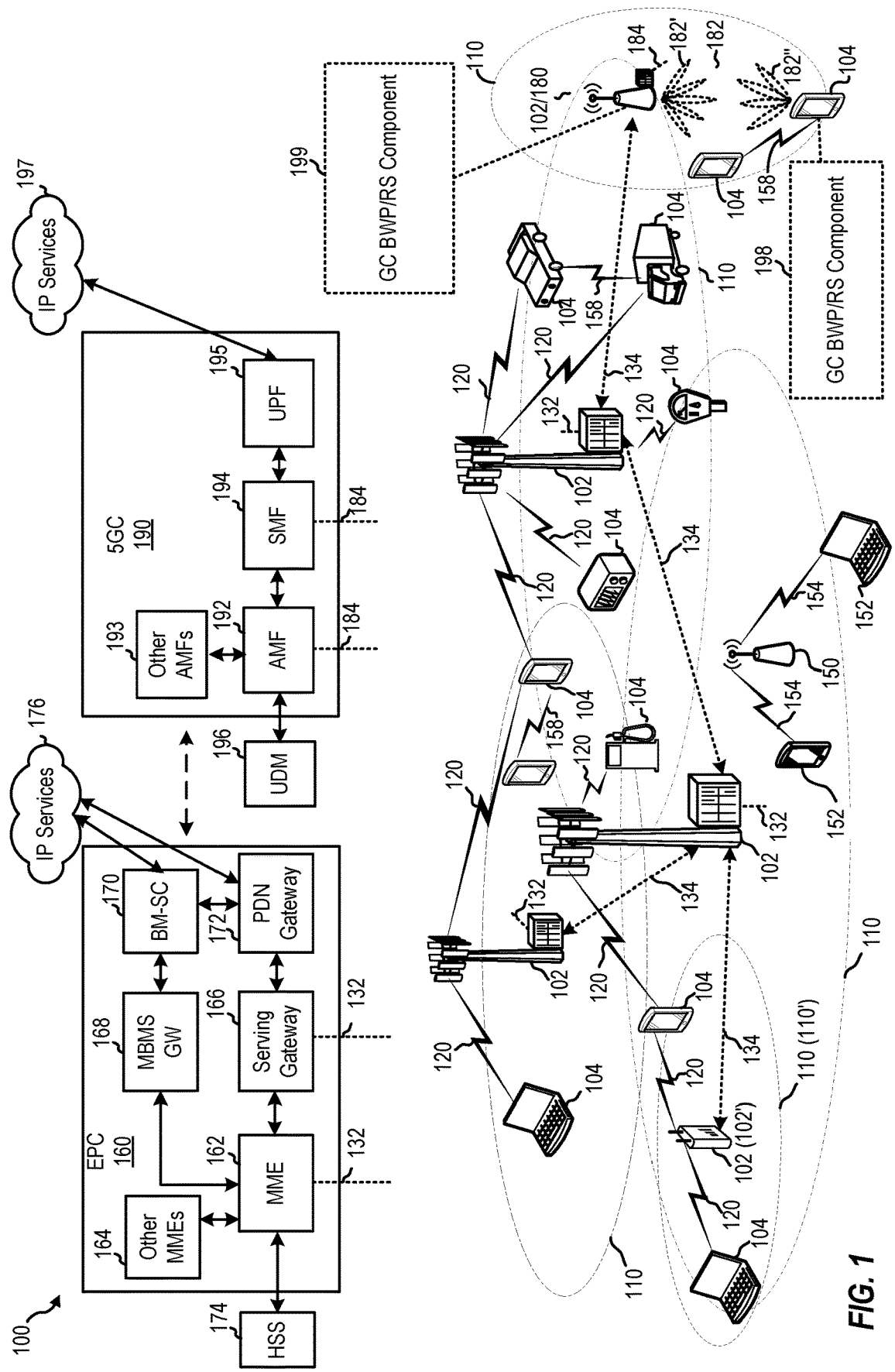
FIG. 1 is a block diagram conceptually illustrating an example wireless communication network.

Aspects of the present disclosure provide apparatuses, methods, processing systems, and computer-readable mediums for power savings for reduced capability (RedCap) devices in a wireless communication network.

User devices may have different capabilities. In some cases, user devices may be associated with a device type or a device category. Some user devices may be considered reduced capability devices. In some examples, a reduced capability UE in new radio (e.g., 5G NR) wireless communication network may have reduced capabilities with respect to a legacy UE. In some examples, reduced capability UEs may be deployed in 5G NR Release 17 (or later) systems and have reduced capability with respect to UEs operating according to earlier releases, such as a 5G NR Release 15 UE or a 5G NR Release 16 UE (e.g., enhanced mobile broadband (eMBB) UEs).

Most BSs can utilize the wide bandwidths available in 5G NR systems. UE capabilities vary, however, and it may be challenging for some UEs to use the available wide bandwidths. BWPs provide flexibility so that multiple signals, including different signal types, can be sent in a given bandwidth for better utilization and adaptation of spectrum and UE power.

A BWP may be a subset of contiguous physical resource blocks (PRBs). With BWPs, a carrier can be subdivided and used for different purposes. Each BWP has its own numerology (e.g., subcarrier spacing (SCS)), meaning that each BWP can be configured differently.

A UE can be configured with multiple BWPs in the uplink and/or in the downlink. BWP configuration parameters can include numerology, frequency location, bandwidth size, and/or control resource set (CORESET). UEs may be configured with an initial BWP part. For example, an initial BWP may be configured in system information, such as in system information block Type1 (SIB1), so that the initial BWP can be used during initial access.

Reduced capability UEs may coexist in the initial BWP with other UEs; however, these reduced capability UEs may cause congestion for the other UEs in the initial BWP. To reduce congestion, the reduced capability UEs can be offloaded to another BWP. The reduced capability UEs may be offloaded before, during, or after radio resource control (RRC) connection establishment. Offloading the reduced capability UEs, however, involves signaling overhead.

Aspects of the present disclosure provide techniques for reducing the signaling overhead for BWP offloading, resulting in power savings for the UEs. As used herein, BWP offloading refers to offloading one or more UEs from one BWP to another BWP, for example, to reduce congestion in the initial BWP. For example, such techniques may involve configuring one or more group common uplink BWPs and/or one or more group common downlink BWPs. A group common BWP can be shared by UEs having the same (or similar) capabilities and/or by UEs having a same device type. For example, one or more group common BWPs may be configured for reduced capability UEs. Aspects of the present disclosure also provide for group common reference signals. In some examples, the group common reference signals can be used in a group common BWP.

Introduction to Wireless Communication Networks

FIG. 1 depicts an example of a wireless communications network 100, in which aspects described herein may be implemented.

Generally, wireless communications network 100 includes base stations (BSs) 102, user equipments (UEs) 104, and one or more core networks, such as an Evolved Packet Core (EPC) 160 and 5G Core (5GC) network 190, which interoperate to provide wireless communications services.

Base stations 102 may provide an access point to EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

Communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. Communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes a group common (GC) BWP/RS component 199, which may be configured to configure a GC BWP configuration and/or a GC RS configuration at one or more UEs 104 and communicate using the GC BWP configuration and/or the GC RS configuration. Wireless communication network 100 further includes a GC BWP/RS component 198, which may be configured to receive a GC BWP configuration and/or a GC RS configuration and communicate with a BS 102 using the GC BWP configuration and/or the GC RS configuration.

Figure 2:
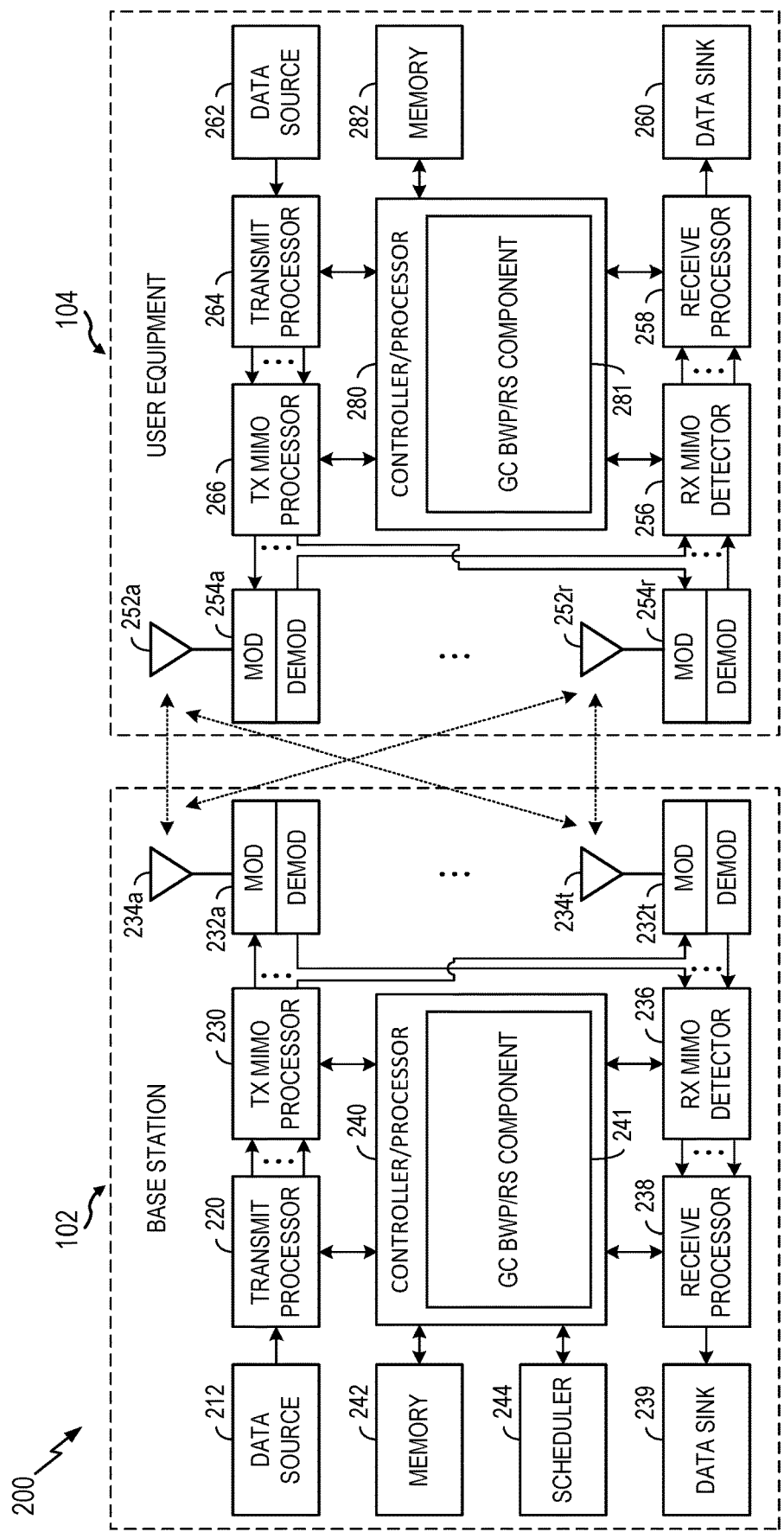
FIG. 2 is a block diagram conceptually illustrating aspects of an example a base station and user equipment.

FIG. 2 depicts aspects of an example base station 102 and an example user equipment 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes GC BWP/RS component 241, which may be representative of GC BWP/RS component 199 of FIG. 1. Notably, while depicted as an aspect of controller/processor 240, GC BWP/RS component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes GC BWP/RS component 281. Notably, while depicted as an aspect of controller/processor 280, GC BWP/RS configuration component 281 may be implemented additionally or alternatively in various other aspects of user equipment 104 in other implementations.

Figure 3:
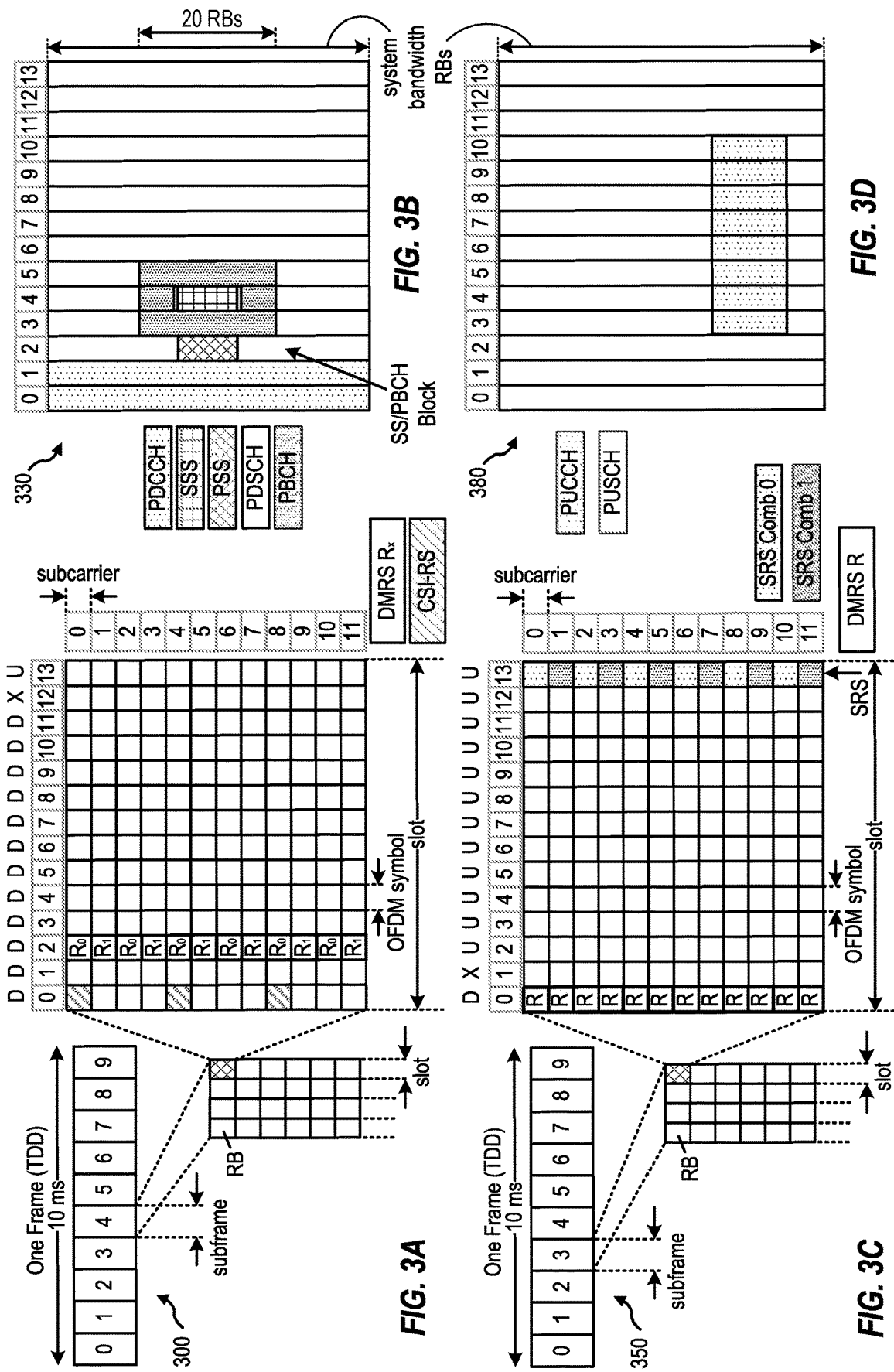
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 (e.g., a gNB) may utilize beamforming 182 with UE 104 to improve path loss and range. To do so, mmWave base station 180 and UE 104 may each include a plurality of antennas, such as antenna elements, antenna panels, and/or antenna arrays to facilitate the beamforming.

In some cases, mmWave base station 180 may transmit a beamformed signal to UE 104 in one or more transmit directions 182'. UE 104 may receive the beamformed signal from mmWave base station 180 in one or more receive directions 182". UE 104 may also transmit a beamformed signal to base station 180 in one or more transmit directions 182". Base station 180 may receive the beamformed signal from UE 104 in one or more receive directions 182'. Base station 180 and UE 104 may then perform beam training to determine the best receive and transmit directions for each of mmWave base station 180 and UE 104. Notably, the transmit and receive directions for mmWave base station 180 may or may not be the same. Similarly, the transmit and receive directions for UE 104 may or may not be the same.

Introduction to Reduced Capability Devices

Wireless communication standards focus on various technologies. For example, Release 15 and/or Release 16 of the 3GPP technical standards may focus on premium smartphones, for example, supporting eMBB, ultra-reliable low-latency communication (URLLC), and/or vehicle-to-everything (V2X) communications. Some wireless communication standards (e.g., 3GPP 5G NR Release 17 and beyond) focus on efficient and cost effective scalability and deployment. A new UE type with reduced capabilities (RedCap) has been introduced. In particular, a RedCap UE may support relaxed peak throughput (e.g., around 20 MHz), latency, and/or reliability requirements. RedCap UEs may have a compact form factor. A RedCap UE may support all NR frequency division duplexing (FDD) bands and time division duplexing (TDD) bands.

Design objectives of NR RedCap UEs may include scalable resource allocation, coverage enhancement for DL and/or UL, power saving in all RRC states, and co-existence with other UEs. For example, RedCap UEs may coexist with non-RedCap UEs, such as NR premium UEs. As used herein, a premium UE may refer to a non-RedCap UE. An NR premium UE may refer to a legacy non-RedCaP NR UE.

An NR-RedCap UE may be a smart wearable device, a sensor/camera (e.g., smart city devices), or any device configured for relaxed internet-of-things (IoT) communications.

Wearables may include such devices as smart watches, augmented reality (AR) glasses, virtual reality (VR) glasses, electronic health (eHealth) monitoring devices, medical monitoring devices, and the like. Wearables may use data rates of around 5-50 Mbps on the downlink and 2-5 Mbps on the uplink. Wearables may have peak rates of around 150 Mbps on the downlink and 50 Mbps on the uplink. Wearables may have latency and reliability targets similar to those of eMBB devices. Wearables may have a battery life of up to 1-2 weeks.

IoT devices may include connected industry devices, such as pressure sensors, humidity sensors, motion sensors, thermal sensors, accelerometers, actuators, and the like. Connected industry devices may use data rates of around 2 Mbps on the uplink. Connected industry devices may have latency targets less than 100 ms, in general, and around 5-10 ms for safety related sensors. Connected industry devices may have high reliability targets, such as around 99.99%. Connected industry devices may have a battery life of at least a few years.

Smart city devices may include such devices as video surveillance equipment, and the like. Smart city devices may use data rates of around 2-4 Mbps for economy devices and around 7.5-25 Mbps for high-end devices. Smart city devices may have latency targets less than 500 ms, in general. Smart city devices may have high reliability targets, such as around 99%-99.99%.

RedCap UE functionality and/or capability may overlap with those of long term evolution (LTE) and/or fifth generation (5G) devices (e.g., premium 5G devices). For example, RedCap IoT devices and premium 5G devices may both support URLLC. Further, RedCap smart wearables and LTE UEs may both support low power wide area (LPWA) massive machine type communication (mMTC). RedCap sensors/cameras and premium 5G device may both support eMBB.

Aspects Related to Power Savings for Reduced Capability Devices

In certain wireless communication systems, such as the wireless communication network 100 of FIG. 1, user devices (e.g., UEs 104) use one or more shared BWPs, such as a shared DL BWP and a shared UL BWP.

An initial UL and/or DL BWP may be configured in system information. For example, a network entity (e.g., a BS 102) may broadcast an initial DL BWP configuration and/or an initial UL BWP configuration in a SIB1.

The user devices may use the initial BWP for initial access. Initial access includes performing a random access procedure. A random access procedure may be a four-step random access procedure or a two-step random access procedure. The random access procedure may be used to establish a RRC connection with the BS.

As discussed above, UEs may be of varying types and capabilities. In some examples, reduced capability UEs may coexist with non-RedCap UEs in the initial BWP (e.g., share the initial BWP), which may lead to congestion in the initial BWP. To reduce congestion, the RedCap UEs can be offloaded to another BWP after RRC connection establishment. However, offloading the RedCap UEs individually to multiple BWPs involves large signaling overhead.

Aspects to the present disclosure provide techniques to reduce overhead and save power. In some examples, one or multiple group common BWPs may be used for the traffic offloading of a group of UEs, as discussed in more detail below.

A group common BWP configuration may be provided to one or more UEs. The group common BWP configuration may include a DL BWP, an UL BWP, or both. The group common BWP configuration may include an indication of the group of UEs that use the group common BWP configuration. For example, the group common BWP configuration may be for UEs of an indicated UE type, UEs that support an indicated set of UE capabilities, UEs of an indicated UE category, and/or another indication of the group of UEs. The group common BWP may be configured for UEs having identical capabilities. For example, the group common BWP may be configured for RedCap UEs. The group common BWP configuration may indicate BWP configuration parameters, such as a numerology, a frequency location, a bandwidth size, and/or a CORESET for the group common BWP.

The UEs may also be provided with BWP switching information. The BWP switching information may instruct the UEs or indicate to the UEs when and/or how to switch to the group common BWP.

As discussed in more detail below, the group common BWP configuration and the BWP switching information can be provided via various types of signaling. The group common BWP configuration can be provided before initial access, during initial access, and/or after RRC connection establishment. The group common BWP configuration can be requested by the UEs. The group common BWP configuration can be based on signaled UE capabilities, the system BW, and/or the system capacity. The UE may also be configured with a group common RS configuration. The group common RS configuration may configured one or more RSs within the group common BWP.

Example UE Methods for a Group Common Bandwidth Part

Figure 4:
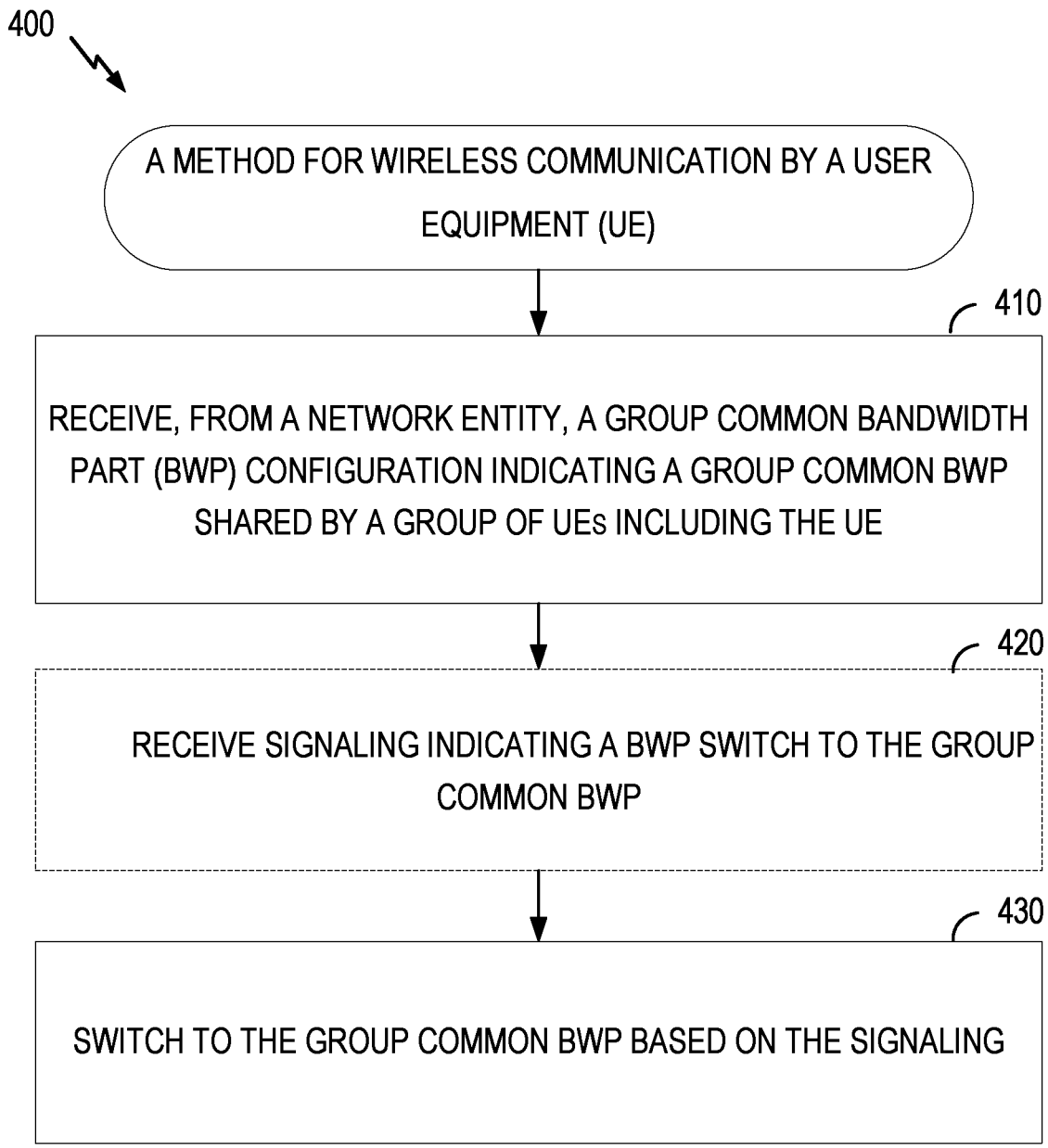
FIG. 4 is a flow diagram illustrating example operations for wireless communication by a user equipment.

FIG. 4 is a flow diagram illustrating example operations 400 for wireless communication, in accordance with certain aspects of the present disclosure. Operations 400 may be performed, for example, by a UE (e.g., such as the UE 104 in the wireless communication network 100 of FIG. 1). Operations 400 may be complementary to operations 600 performed by a network entity. Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the GC BWP/RS component 281) obtaining and/or outputting signals.

Operations 400 begin, in block 410, with receiving, from a network entity, a group common BWP configuration indicating a group common BWP shared by a group of UEs including the UE. The group common BWP configuration may be shared by the group of UEs based on one or more common capabilities of the UEs or a type of the UEs. The group common BWP may be a group common downlink BWP, a group common uplink BWP, or both.

Receiving the group common BWP configuration at block 410 may include receiving system information indicating the group common BWP configuration. In some examples, the UE receives a broadcast SIB1 or other system information (OSI) indicating the group common BWP configuration. SIB1 and OSI may be broadcast periodically.

The operations 400 may include sending a message requesting an on-demand SIB. Receiving the group common BWP configuration at block 410 may include receiving a broadcast on-demand SIB indicating the group common BWP configuration in response to the request. The message requesting the on-demand SIB may be an initial access message. The message requesting the on-demand SIB may be an uplink signal. For example, the message requesting the on-demand SIB may be a physical random access channel (PRACH), a physical uplink shared channel (PUSCH), a physical uplink control channel (PUCCH), a demodulation reference signal (DMRS), or a sounding reference signal (SRS). The on-demand SIB may be received during or after initial access.

The operations 400 may include transmitting an initial access message or an uplink signal indicating one or more capabilities of the UE or a UE type. Receiving the group common BWP at block 410 may be based on the indicated one or more capabilities of the UE.

Receiving the group common BWP configuration at block 410 may include receiving the group common BWP configuration in a physical downlink shared channel (PDSCH) random access message.

Optionally, at block 420, the UE receives signaling indicating a BWP switch to the group common BWP.

Receiving the signaling indicating a BWP switch to the group common BWP at block 420 may include receiving the signaling indicating the BWP during an initial access procedure. Receiving the signaling indicating a BWP switch to the group common BWP at block 420 may include receiving the signaling indicating the BWP switch in a physical downlink control channel (PDCCH) scheduling a PDSCH random access message. The indication of the BWP switch may be in downlink control information (DCI) reserved bits, one or more unused fields in the DCI, one or more new fields in the DCI, a DMRS pattern of the PDCCH, cyclic redundancy bits (CRC) bits of the PDCCH payload, a scrambling identifier of the PDCCH, a dedicated CORESET of the PDCCH, or one or more search space sets of the PDCCH. Receiving the signaling indicating a BWP switch to the group common BWP at block 420 may include receiving the signaling indicating the BWP switch in a PDSCH random access message.

Receiving the signaling indicating a BWP switch to the group common BWP at block 420 may include receiving the signaling indicating the BWP switch in a message after completing RRC connection setup. Receiving the signaling indicating a BWP switch to the group common BWP at block 420 may include receiving the signaling indicating the BWP switch in a PDCCH in user-specific search space (USS) or in common search space (CSS). Receiving the signaling indicating a BWP switch to the group common BWP at block 420 may include receiving the signaling indicating the BWP switch in a multicast PDSCH or in a unicast PDSCH.

At block 430, the UE switches to the group common BWP based on the signaling received at block 420. For the example, the UE switches to the group common BWP based on a received PDCCH, MAC CE, timer, or RRC message.

The operations 400 may include performing initial access with a BS using an initial BWP to establish a RRC connection with the BS. Switching to the group common BWP at block 430 may include switching from the initial BWP to the group common BWP after establishing the RRC connection with the BS.

Operations 400 may include receiving a group common RS configuration for one or multiple RS types transmitted in the group common BWP. Operations 400 may include receiving a measurement object. Operations 400 may include monitoring one or more RSs in the group common BWP based on the group common RS configuration. Operations 600 may include receiving filtering parameters and combining procedures configured for one or multiple RS types used for time, phase, automatic gain control (AGC), and frequency tracking loops of the UE's transmitter and receiver, radio resource management (RRM) measurement, radio link monitoring (RLM) measurements, or a combination thereof. Operations 400 may include measuring, filtering, and combining one or multiple RS types based on the signaled parameters and combining procedures. Operations 600 may include applying the filtered one or multiple RS to the time, phase, AGC and frequency tracking loops. Operations 400 may include generating an RRM measurement report or a RLM measurement report. The RRM or RLM measurement reports may be based on measurements of one or more group common RSs in the group common BWP. Operations 400 may include transmitting the RRM or RLM measurement report to the network entity.

Figure 5:
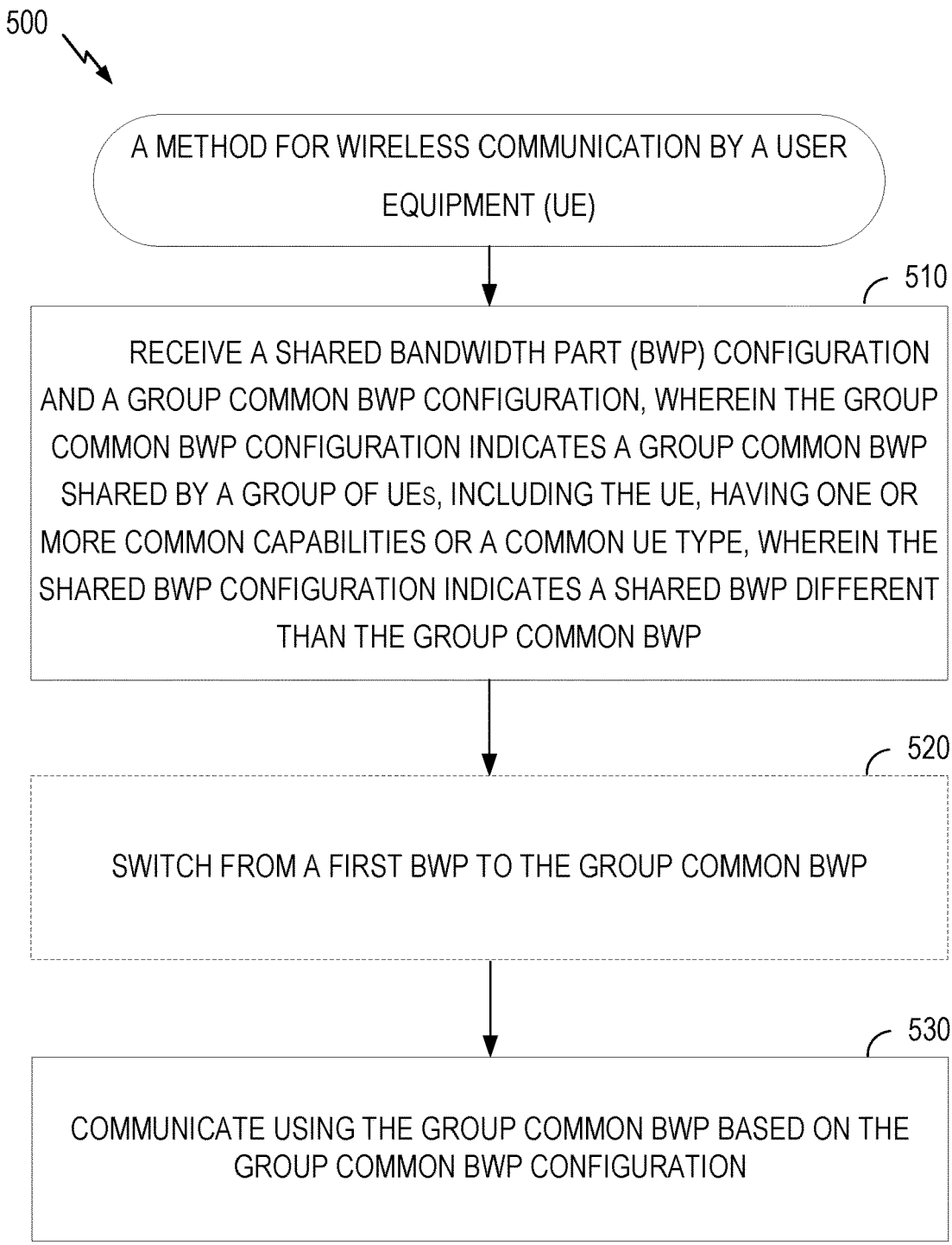
FIG. 5 is a flow diagram illustrating example operations for wireless communication by a user equipment.

FIG. 5 is a flow diagram illustrating example operations 500 for wireless communication, in accordance with certain aspects of the present disclosure. Operations 500 may be performed, for example, by a UE (e.g., such as the UE 104 in the wireless communication network 100 of FIG. 1). Operations 500 may be complementary to operations 700 performed by a network entity. Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the GC BWP/RS component 281) obtaining and/ or outputting signals.

Operations 500 begin, in block 510, with receiving a shared BWP configuration and a group common BWP configuration. The shared BWP configuration may be an initial UL BWP, an initial DL BWP, or both an initial UL BWP and an initial DL BWP. The group common BWP configuration indicates a group common BWP shared by a group of UEs, including the UE, having one or more common capabilities or a common UE type. For example, the group common BWP configuration may be for RedCap UEs. The shared BWP and the group common BWP are different BWPs.

The shared BWP configuration and the group common BWP configuration may be received in system information, such as in a SIB1. The system information may be received in a PDSCH. The system information may be received in a first BWP different than the shared BWP and the group common BWP. A random access PDSCH may be scheduled by a PDCCH. The PDCCH may be received in a CORESETO.

In some examples, operations 500 include, at block 520, switching from the first BWP to the group common BWP. In some but not all cases, the UE switches from the first BWP to the group common BWP, at block 520, prior to communicating using the group common BWP based on the group common BWP configuration.

Operations 500 include, at block 530, communicating using the group common BWP based on the group common BWP configuration.

Example Network Methods for a Group Common Bandwidth Part

Figure 6:
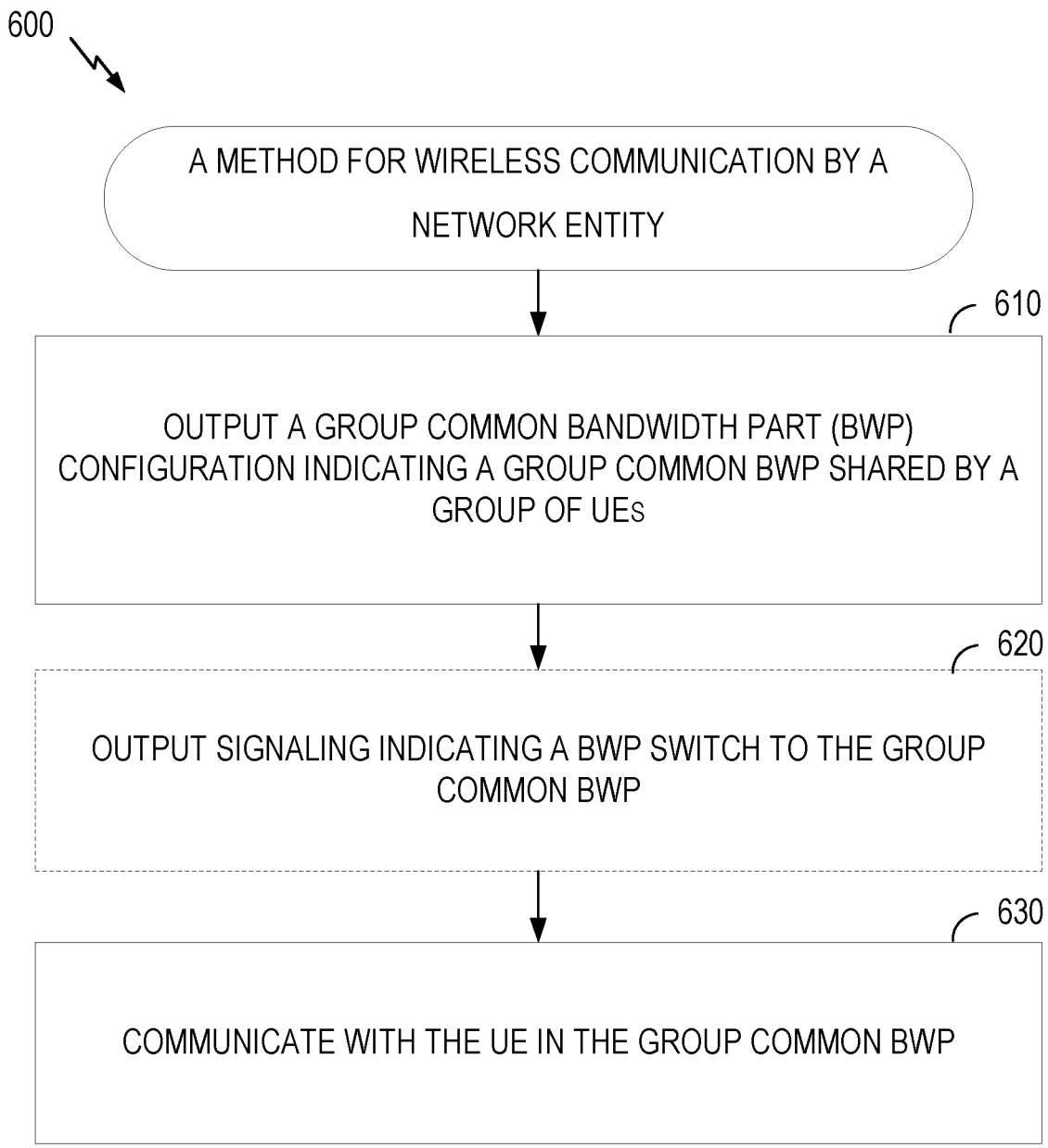
FIG. 6 is a flow diagram illustrating example operations for wireless communication by a base station.

FIG. 6 is a flow diagram illustrating example operations 600 for wireless communication. Operations 600 may be performed, for example, by a network entity (e.g., such as the BS 102 in the wireless communication network 100 of FIG. 1). Operations 600 may be implemented as software components that are executed and run on one or more processors (e.g., controller/processor 240 of FIG. 2). Further, the transmission and reception of signals by the network entity in operations 600 may be enabled, for example, by one or more antennas (e.g., antennas 234 of FIG. 2). In certain aspects, the transmission and/or reception of signals by the network entity may be implemented via a bus interface of one or more processors (e.g., controller/processor 240, including the GC BWP/RS component 241) obtaining and/or outputting signals.

Operations 600 begin at block 610 with outputting a group BWP configuration indicating a group common BWP shared by a group of UEs including the UE.

Optionallly, at block 620, the network entity outputs signaling indicating a BWP switch to the group common BWP.

At block 630, the network entity communicates with the UE in the group common BWP.

The network entity may perform corresponding operations to the operations 400 by the UE.

Figure 7:
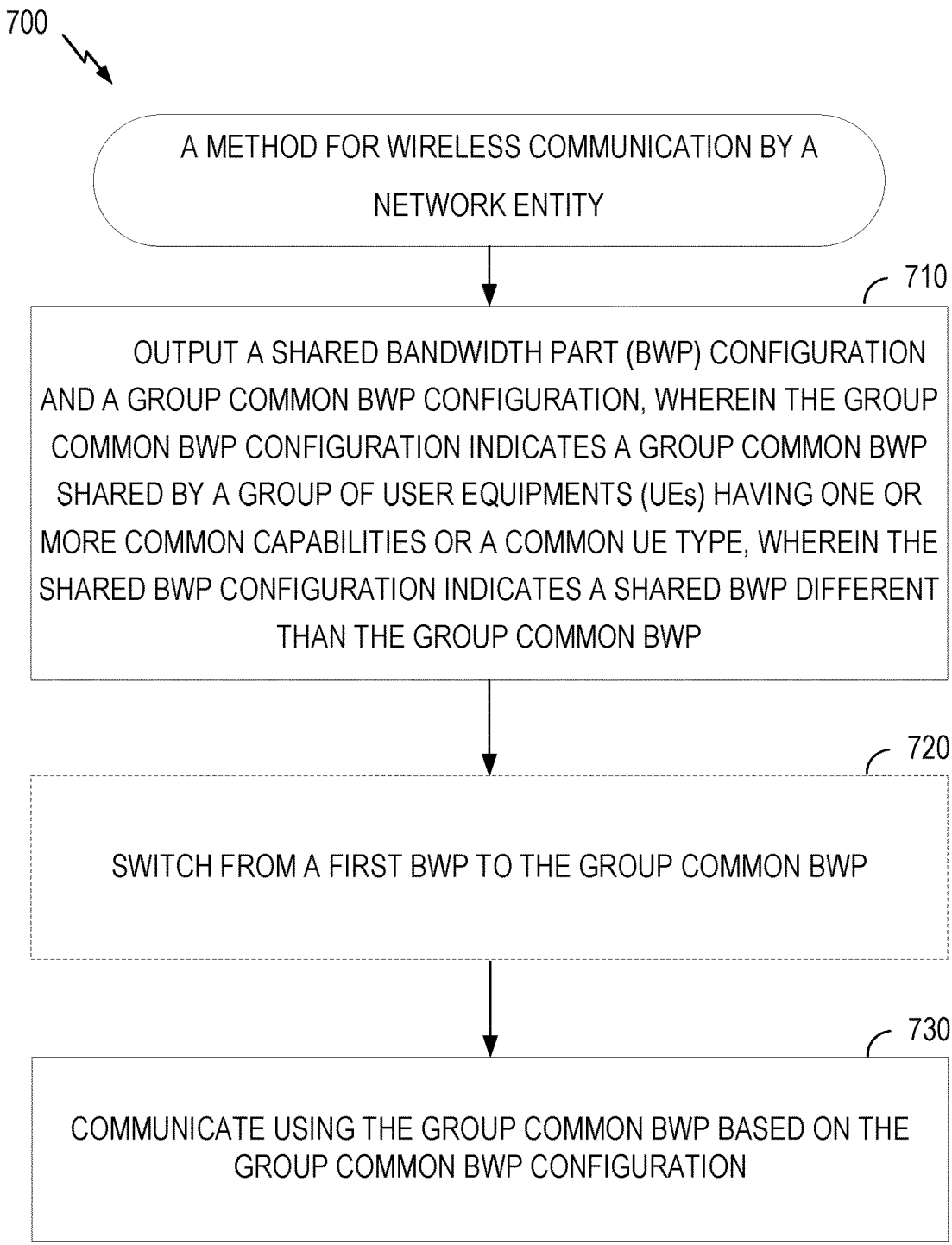
FIG. 7 is a flow diagram illustrating example operations for wireless communication by a base station.

FIG. 7 is a flow diagram illustrating example operations 700 for wireless communication. Operations 700 may be performed, for example, by a network entity (e.g., such as the BS 102 in the wireless communication network 100 of FIG. 1). Operations 700 may be implemented as software components that are executed and run on one or more processors (e.g., controller/processor 240 of FIG. 2). Further, the transmission and reception of signals by the network entity in operations 700 may be enabled, for example, by one or more antennas (e.g., antennas 234 of FIG. 2). In certain aspects, the transmission and/or reception of signals by the network entity may be implemented via a bus interface of one or more processors (e.g., controller/processor 240, including the GC BWP/RS component 241) obtaining and/or outputting signals.

Operations 700 begin, in block 710, with outputting a shared BWP configuration and a group common BWP configuration. The shared BWP configuration may be an initial UL BWP, an initial DL BWP, or both an initial UL BWP and an initial DL BWP. The group common BWP configuration indicates a group common BWP shared by a group of UE having one or more common capabilities or a common UE type. For example, the group common BWP configuration may be for RedCap UEs. The shared BWP and the group common BWP are different BWPs.

The shared BWP configuration and the group common BWP configuration may be output for transmission in system information, such as in a SIB1. The system information may be output for transmission in a PDSCH. The system information may be output for transmission in a first BWP different than the shared BWP and the group common BWP. A random access PDSCH may be scheduled by a PDCCH. The PDCCH may be received in a CORESETO.

Operations 700 may include, at block 720, switching from the first BWP to the group common BWP. In some but not all cases, the network entity switches from the first BWP to the group common BWP, at block 720, prior to communicating using the group common BWP based on the group common BWP configuration.

Operations 700 include, at block 730, communicating using the group common BWP based on the group common BWP configuration.

Example Call Flow Illustrating Operations for a Group Common Bandwidth Part

Figure 8:
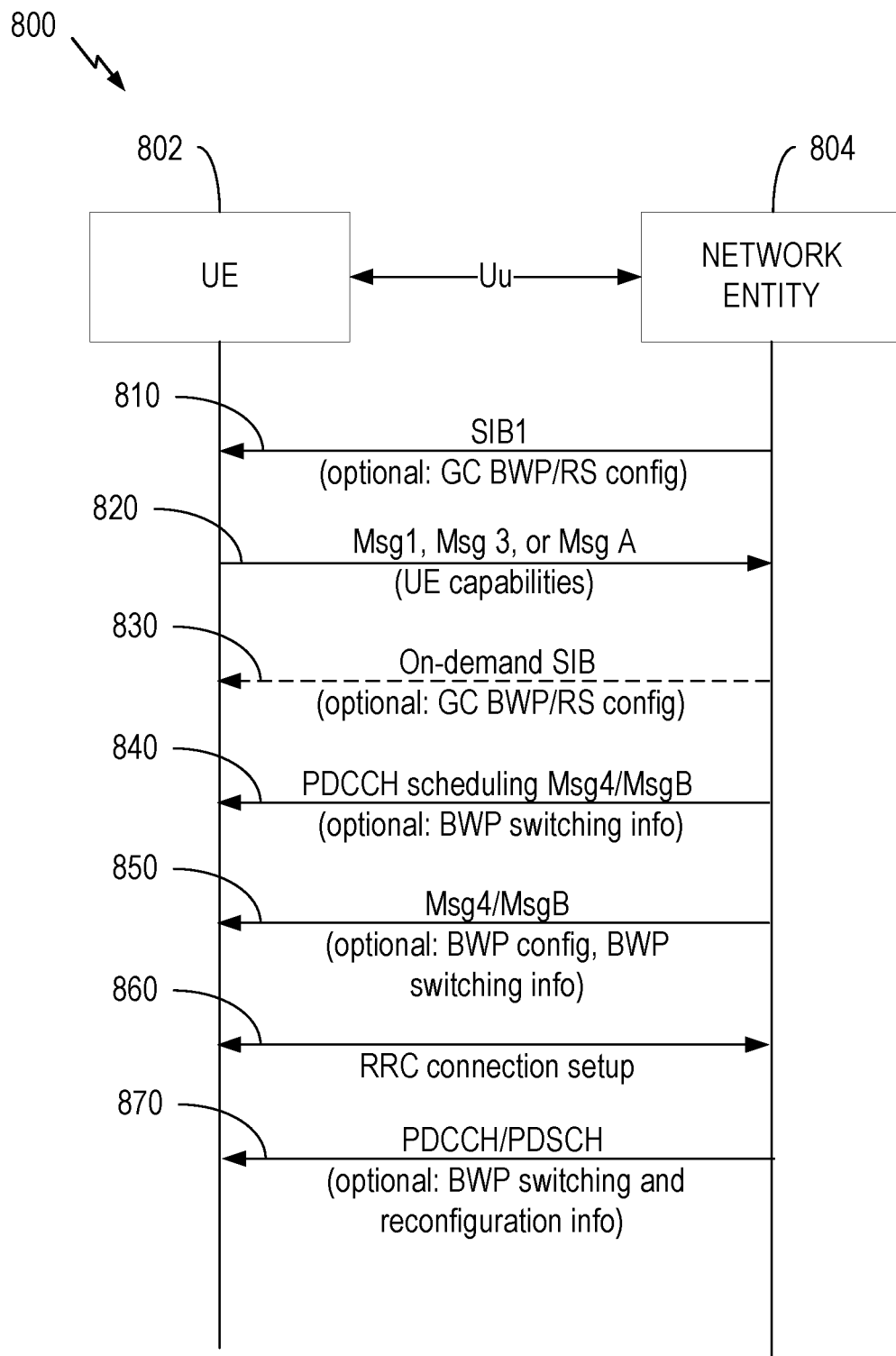
FIG. 8 is a call flow diagram illustrating example operations between a base station and a user equipment for communicating using a group common BWP.

FIG. 8 is a call flow diagram illustrating example operations 800 between a network entity 804 and a UE 802. In some cases, the network entity 804 may be an example of BS 102 in the wireless communication network 100 illustrated in FIG. 1. Similarly, UE 802 may be an example of UE 104 illustrated in FIG. 1. Further, as shown, a Uu interface may be established to facilitate communication between network entity 804 and UE 802, however, in other aspects, a different type of interface may be used.

As shown, operations 800 illustrated in FIG. 8 begin at 810 with receiving a SIB1. The SIB1 is broadcast from network entity 804 to UE 802. In some examples, the group common BWP configuration is provided in the SIB1. The SIB1 may, additionally or alternatively, provide the UE with a group common RS configuration. The SIB1 may also provide the UE with the initial BWP configuration.

After receiving SIB1, UE 802 and network entity 804 perform initial access. For the initial access, a four-step or two-step random access procedure may be performed.

In the four-step random access procedure, a first message (MSG1) may be sent from UE 802 to network entity 804 on a PRACH. The MSG1 may only include a RACH preamble. Network entity 804 may respond with a random access response (RAR) message (MSG2) which may include the identifier (ID) of the RACH preamble, a timing advance (TA), an uplink grant, a cell radio network temporary identifier (C-RNTI), and a back off indicator. The MSG2 may include a PDCCH communication including control information for a following communication on the PDSCH, as illustrated. In response to MSG2, MSG3 is transmitted from UE 802 to network entity 804 on the PUSCH. MSG3 may include one or more of a RRC connection request, a tracking area update request, a system information request, a positioning fix or positioning signal request, or a scheduling request. Network entity 804 then responds with MSG 4 which may include a contention resolution message.

In the two-step RACH procedure, the four messages of the four-step RACH procedure are effectively collapsed into two messages. A first message (msgA) may be sent from UE 802 to network entity 804. MsgA includes some or all the information from MSG1 and MSG3 from the four-step RACH procedure, effectively combining MSG1 and MSG3. For example, msgA may include MSG1 and MSG3 multiplexed together such as using one of time-division multiplexing or frequency-division multiplexing. MsgA includes a RACH preamble for random access and a payload. MsgA payload, for example, may include the UE-ID and other signaling information (e.g., buffer status report (BSR)) or scheduling request (SR). Network entity 804 may respond with a RAR message (msgB) which may effectively combine MSG2 and MSG4 described above. For example, msgB may include the ID of the RACH preamble, a TA, a back off indicator, a contention resolution message, UL/DL grant, and transmit power control (TPC) commands.

UE 802 can provide an indication of its capabilities during the initial access. At 820, UE 802 can provide its UE capabilities in a msg1, msg3, or msgA transmission to network entity 804. In some examples, network entity 804 sends the group common BWP configuration based on the indicated UE capabilities. At 820, UE 802 can provide a request for an on-demand SIB. UE 802 can provide a request for the group common BWP configuration and/or for a group common RS configuration.

At 830, UE 802 may receive a further SIB, which may be an on-demand SIB. The further SIB may be sent by network entity 804 in response to the UE capabilities and/or in response to the request from the UE. The further SIB, at 830, may include the group common BWP configuration. The further SIB, at 830, may additionally or alternatively, include the group common RS configuration.

At 840, UE 802 may receive a PDCCH from network entity 804 that schedules a msg4 (e.g., in the four-step random access procedure) or that schedules a MsgB (e.g., in the two-step random access procedure success RAR). The PDCCH, at 840, may include the BWP switching information. The BWP switching information may be carried in reserved DCI bits (e.g., in DCI format 1_0), in unused DCI fields, or in a new DCI field. The signaling for BWP switching can be in DCI mapped to PDCCH, in a MAC CE mapped to PDSCH, a timer configuration mapped to PDSCH, or in an RRC message mapped to PDSCH.

At 850, UE 802 may receive the scheduled msg4 (e.g., in the four-step random access procedure) or the scheduled MsgB (e.g., in the success RAR in the two-step random access procedure). The msg4 or MsgB, at 840, may include the group common BWP configuration. The msg4 or MsgB, at 840, may, additionally or alternatively, include the BWP switching information. The group common BWP configuration and/or BWP switching information may be carried in a MAC CE or a MAC subheader mapped to the PDSCH carrying the msg4 or msgB SuccessRAR.

At 860, UE 802 performs the RRC connection setup to establish an RRC connection with network entity 804 and complete the initial access. After establishing the RRC connection, at 870, UE 802 can receive further PDCCH and/or PDSCH from network entity 804. The PDCCH and/or PDSCH received after the initial access procedure may include BWP switching information. The PDCCH and/or PDSCH may include RRC reconfiguration information. The PDCCH may be transmitted in USS or in CSS. The PDSCH may be unicast or multicast. The PDSCH may carry a MAC-CE, a timer, and/or RRC reconfiguration information for BWP switching.

The group common BWP configuration, group common RS configuration, and/or BWP switching information may be provided via any of the signaling described above or a combination of the signaling described above.

UE 802 may offload to the group common BWP based on the group common BWP configuration and the BWP switching information. UE 802 may monitor and measure group common RSs based on the group common RS configuration.

Additional Considerations Regarding Power Savings for Reduced Capability Devices A group common BWP may be an unrestricted BWP. An unrestricted BWP may not have any synchronization signal block (SSB) transmissions and/or may not have a configured CORESET 0 in it. To reduce or avoid measurement gaps for RRM and/or RLM measurements and for time tracking, phase tracking, AGC tracking, and/or frequency loop tracking, group common reference signals (RSs) may be configured. The group common RSs may be added to one or more measurement objects for performing RRM and/or RLM in the serving cell.

While some are examples described herein with respect to group common RSs that are transmitted and received in a group common BWP, group common RSs may also be transmitted and received in other types of BWPs.

The group common RSs may be one or multiple of group common channel state information reference signals (CSI-RSs), group common tracking reference signals (TRSs), group common positioning reference signals (PRSs), group common secondary synchronization signals (SSS), group common resynchronization signals, and/or group common sequence based wakeup signals (WUSs).

A group common RS configuration may include configuration of the transmission schedules and resource set assignments for the group common RSs.

The group common RS configuration may be configured as part of the group common BWP configuration or may be configured separately from the group common BWP configuration. The UE may also be configured with a measurement object configuration. A measurement object configuration may include one or multiple RS types to measure. The measurement object configuration may be shared by a group of UEs operating in a group common BWP. For example, an RRM measurement object in the serving cell may include TRS, CSI-RS, PRS, and SSB. A UE configured with a measurement object configuration may measure the one or more RSs included in the measurement object configuration, filter the measurements of the RSs, and/or combine the measurements of the RSs to generate a report for RRM and/or RLM.

The group common RSs may be multicast and/or broadcast. The group common RSs can be sent periodically, aperiodically, or both. Aperiodic transmission of the group common RSs may be triggered by a DCI or a MAC CE.

The group common RSs, or some types of the group common RSs, can be transmitted with power booting, and can be added to a measurement object.

Filtering coefficients, weighting coefficients, and/or other parameters can be configured as part of the group common RS configuration. Combining procedures can be configured as part of the group common RS configuration. The UE can apply the configured filtering coefficients, weighting coefficients, parameters, and/or combining procedures to the one or more group common RSs. The filtering coefficients, weighting coefficients, combining procedures, parameters, and/or RS types can be specified by one or more look up tables (LUTs), signaled by the network, or left to UE implementation.

The resource sets of group common RSs may be jointly configured with connected mode discontinuous reception (CDRX) cycles of the UEs. CDRX is an energy saving mode. CDRX configures short and long DRX configurations that providing ON durations and OFF durations, where the UE monitors for transmissions during the ON durations and enters a low power mode during the OFF durations.

Different UEs, or groups of UEs, may be configured with different CDRX cycles. Accordingly, the group common RSs may be configured such that group common RSs can be used as WUS for waking by one or more UEs or groups of UEs and/or can be used by one or more other UEs or groups of UEs for measurement. The group common RSs can be configured such that all of the UEs can receive group common RSs for wake up, tracking, RRM measurement, RLM measurement, and/or other purposes.

Figure 9:
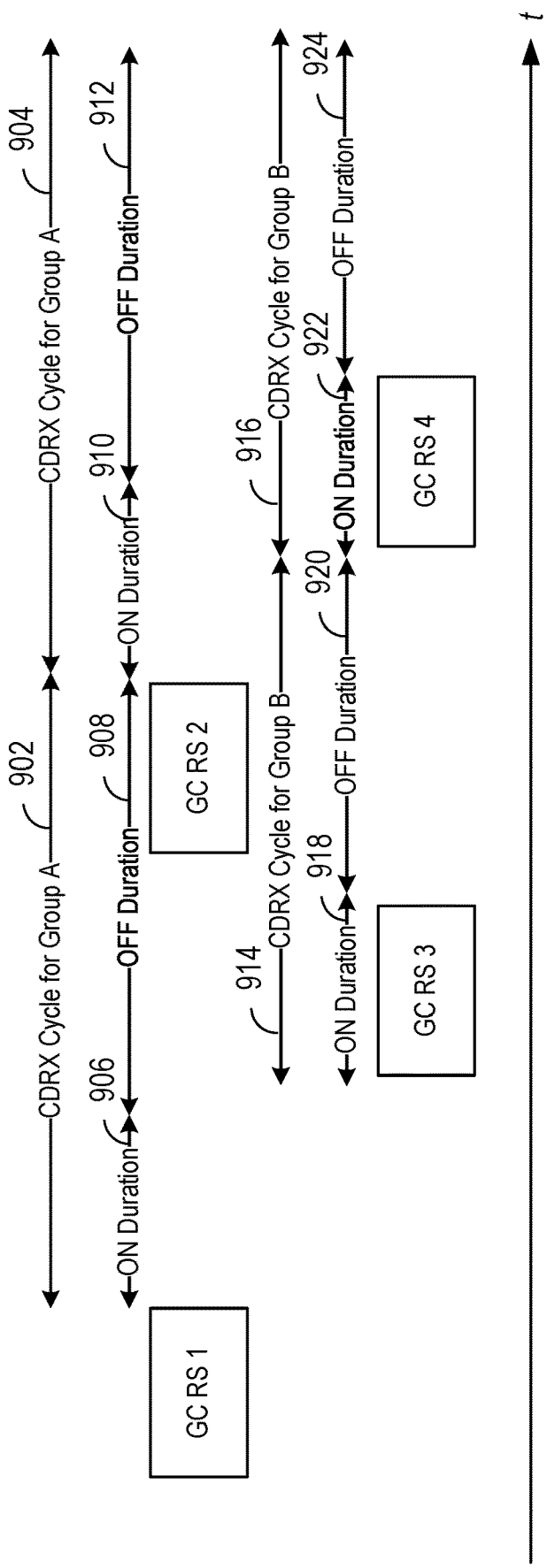
FIG. 9 illustrates example group common reference signals for groups of user equipments with different connected mode discontinuous reception cycles

As shown in FIG. 9, a first group of UEs (Group-A UEs) may be configured with a first CDRX cycle configuration that defines CDRX cycles. As shown, a first CDRX Cycle for Group A 902 defines an ON duration 906 and OFF duration 908 and a second CDRX Cycle for Group A 904 defines an ON duration 910 and OFF duration 912 for UEs in the Group A. As shown, a first CDRX Cycle for Group B 914 defines an ON duration 918 and OFF duration 920 and a second CDRX Cycle for Group B 916 defines an ON duration 922 and OFF duration 924 for UEs in the Group B.

Group common RSs, can be configured for multiple uses. For example, the GC RS 1 and the GC RS 2 can be used as a WUS for the group A UEs as well as for time loop tracking, frequency loop tracking, AGC tracking, and/or phase tracking for the group A UEs. The GC RS 1 and the GC RS 2 can be transmitted before the CDRX ON durations 906 and 910 of the group A UEs. The GC RS 3 and the GC RS 4 can be used as a WUS for the group B UEs as well as for time tracking, AGC tracking, phase tracking, and/or frequency loop tracking for the group B UEs. The GC RS 3 and the GC RS 4 can also be used by the Group A UEs and/or by the Group B UEs for RRM and/or RLM measurements. Thus, the network may configure the group common RSs in an effort to coordinate with the CDRX cycles of the UEs to provide various uses for the RSs for the different UEs and groups of UEs.

Example UE Methods for Group Common Reference Signals

Figure 10:
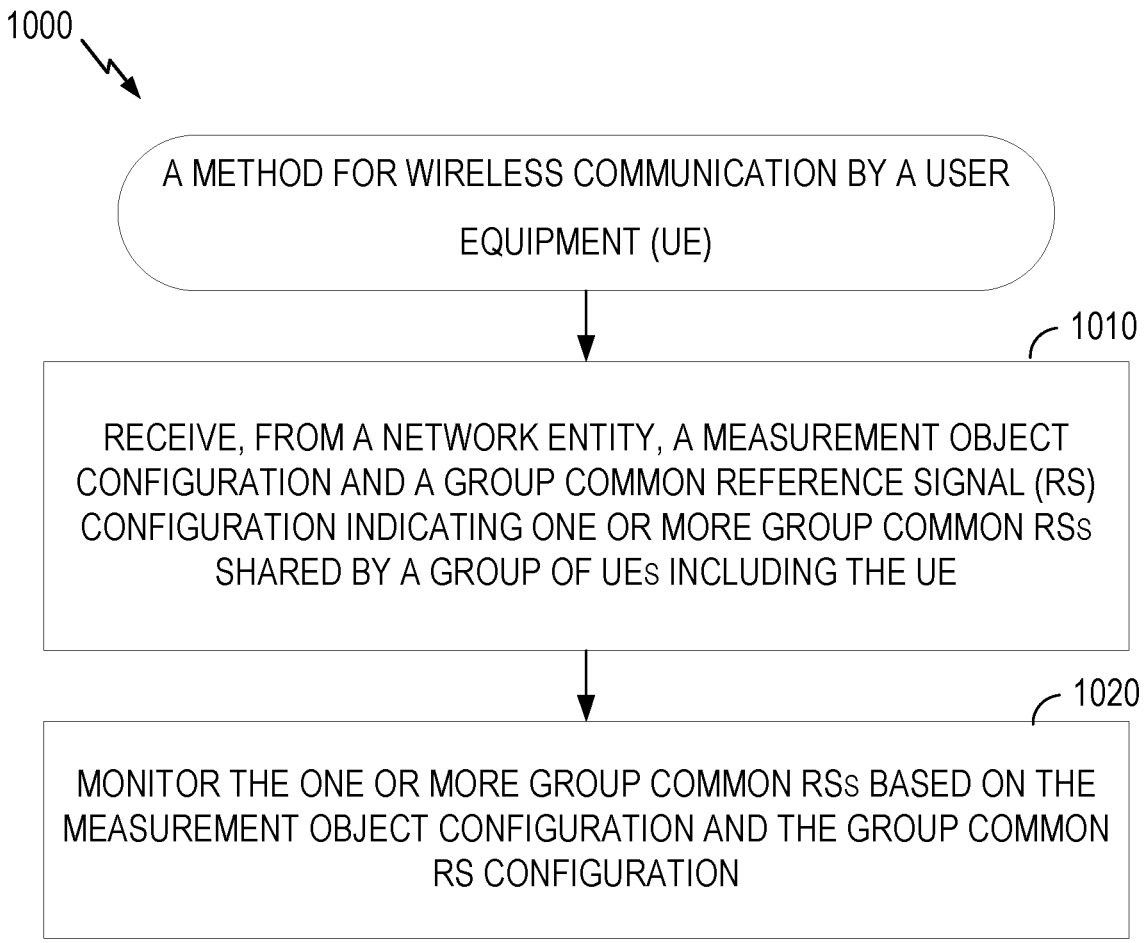
FIG. 10 is a flow diagram illustrating example operations for wireless communication by a user equipment.

FIG. 10 is a flow diagram illustrating example operations 1000 for wireless communication, in accordance with certain aspects of the present disclosure. Operations 1000 may be performed, for example, by a UE (e.g., such as the UE 104 in the wireless communication network 100 of FIG. 1). Operations 1000 may be complementary to operations 1200 performed by the network entity. Operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the GC BWP/RS component 281) obtaining and/or outputting signals.

Operations 1000 begin, in block 1010, with receiving, from a network entity, a measurement object configuration and a group common RS configuration indicating one or more group common RSs shared by a group of UEs including the UE. The group common RS configuration may be shared by the group of UEs based on one or more common capabilities of the UEs or a type of the UEs. The one or more group common RSs may include a group common CSI-RS, a group common TRS, a group common PRS, a group common SSS, a group common resynchronization signal, and/or a group common sequence-based WUS.

One or more resource sets for the one or more group common RSs may be configured jointly with a CDRX configuration for the UE. The one or more of the one or more group common RSs may be configured with power boosting. One or more of the one or more group common RSs may be configured with filter coefficients, weighting coefficients, or both.

Receiving the group common RS configuration at block 1010 may include receiving system information indicating the group common RS configuration. Receiving the group common RS configuration at block 1010 may include receiving a broadcast SIB1 indicating the group common RS configuration.

Operations 1000 may include sending a message requesting an on-demand SIB. Receiving the group common RS configuration at block 1010 may include receiving a broadcast on-demand SIB indicating the group common RS configuration in response to the request. The message requesting the on-demand SIB may be an initial access message. The on-demand SIB is received during initial access.

Operations 1000 may include transmitting an initial access message indicating one or more capabilities of the UE. Receiving the group common RS at block 1010 may be based on the indicated one or more capabilities of the UE.

At block 1020, the UE monitors the one or more group common RSs based on the measurement object configuration and the group common RS configuration. Operations 1000 may include waking up during a DRX OFF period based on receiving one of the one or more group common RSs. Monitoring the one or more group common RSs may depend on whether the UE has a capability to monitor the one or more group common RSs and a frequency location of the one or more group common RSs. Monitoring the one or more group common RSs may be based on whether the RS is configured for intra-frequency or inter-frequency measurement.

The one or more group common RSs may be broadcast or multicast. The one or more group common RSs may be received periodically. The one or more group common RSs may be received aperiodically.

Operations 1000 may include performing RRM measurements, RLM measurements, or both RRRM measurements and RLM measurements on the one or more group common RSs.

Operations 1000 may include receiving a group common BWP configuration indicating a group common BWP shared by a group of UEs including the UE. Monitoring the one or more group common RSs at block 1020 may include monitoring the one or more group common RSs in the group common BWP. The group common RS configuration may be configured when the group common BWP comprises a group common downlink BWP that does not contain a SSB transmission or a CORESET 0 transmission.

A transmission schedule for the one or more group common RSs, a configuration of one or more resource sets for the one or more group common RSs, or both may be signaled with the group common BWP configuration. The transmission schedule for the one or more group common RSs, the configuration of one or more resource sets for the one or more group common RSs, or both may be signaled separately from the group common BWP configuration.

Operations 1000 may include performing time tracking, phase tracking, AGC tracking, frequency tracking, or a hybrid of them based on the one or more group common RSs.

Figure 11:
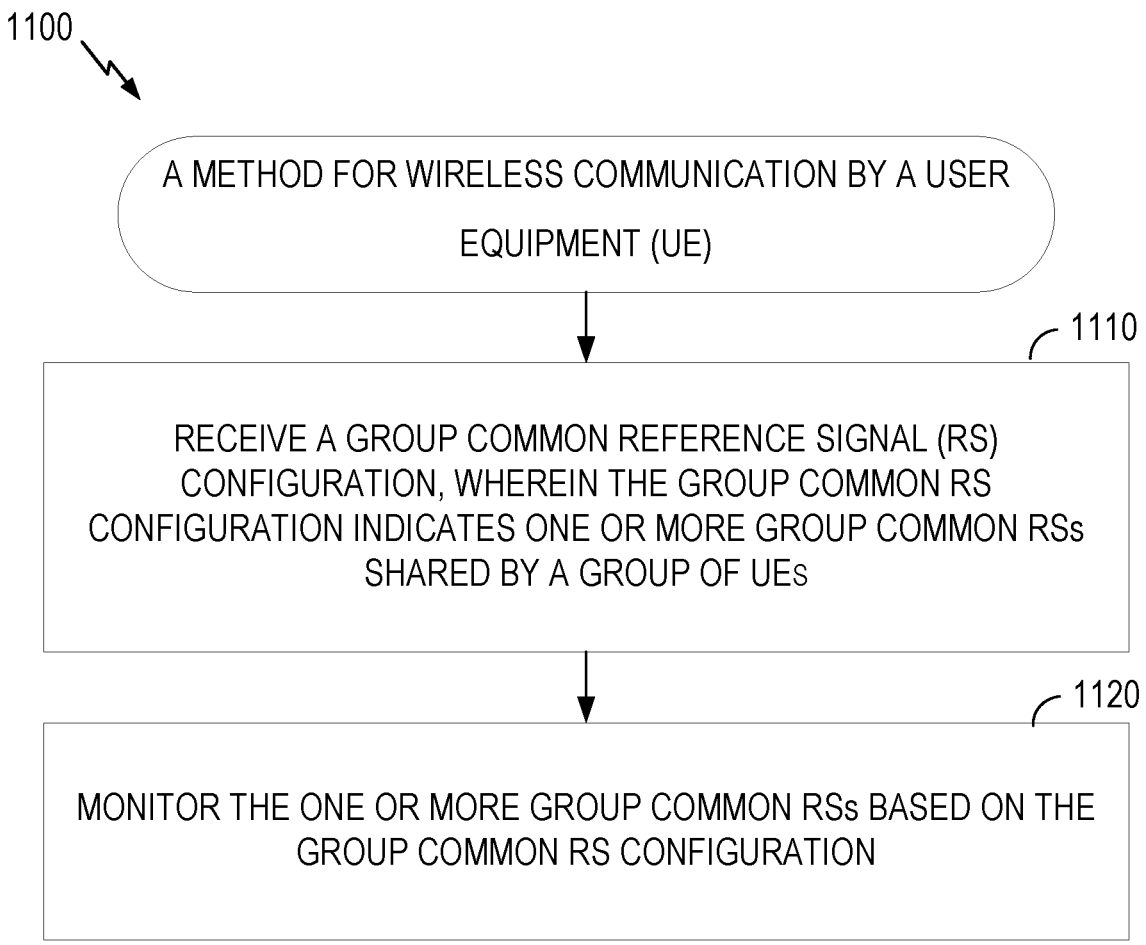
FIG. 11 is a flow diagram illustrating example operations for wireless communication by a user equipment.

FIG. 11 is a flow diagram illustrating example operations 1100 for wireless communication, in accordance with certain aspects of the present disclosure. Operations 1100 may be performed, for example, by a UE (e.g., such as the UE 104 in the wireless communication network 100 of FIG. 1). Operations 1100 may be complementary to operations 1300 performed by the network entity. Operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the GC BWP/RS component 281) obtaining and/or outputting signals.

Operations 1100 begin, in block 1110, with receiving a group common RS configuration. The group common RS configuration indicates one or more group common RSs shared by a group of UEs including the UE.

At block 1120, the UE monitors the one or more group common RSs based on the group common RS configuration. The UE may monitor the one or more group common RSs in a group common BWP. The one or more group common RSs may be one or more group common TRSs, one or more group common PRSs, one or more group common synchronization signals, one or more group common CSI-RRs, one or more group common RSSs, one or more group common sequence-based WUSs, or a combination thereof.

Example Network Methods for Group Common Reference Signals

Figure 12:
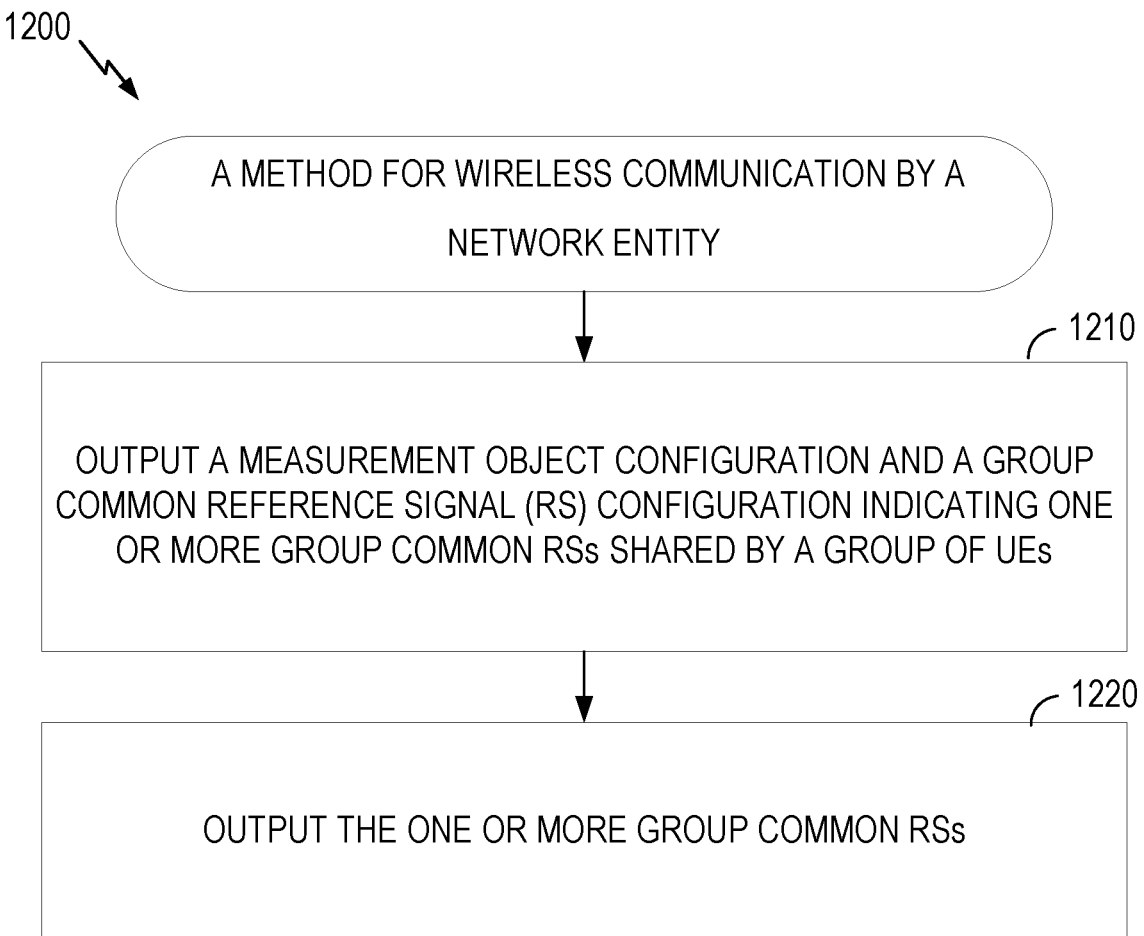
FIG. 12 is a flow diagram illustrating example operations for wireless communication by a base station.

FIG. 12 is a flow diagram illustrating example operations 1200 for wireless communication. Operations 1200 may be performed, for example, by a network entity (e.g., such as the BS 102 in the wireless communication network 100 of FIG. 1). Operations 1200 may be implemented as software components that are executed and run on one or more processors (e.g., controller/processor 240 of FIG. 2). Further, the transmission and reception of signals by the network entity in operations 1200 may be enabled, for example, by one or more antennas (e.g., antennas 234 of FIG. 2). In certain aspects, the transmission and/or reception of signals by the network entity may be implemented via a bus interface of one or more processors (e.g., controller/processor 240, including the GC BWP/RS component 241) obtaining and/or outputting signals.

Operations 1200 begin at 1210 with outputting a measurement object configuration and a group common RS configuration indicating one or more group common RSs shared by a group of UEs including the UE.

At block 1220, the network entity outputs the one or more group common RSs.

The BS can perform complementary operation to the operations 1000 performed by the UE.

Figure 13:
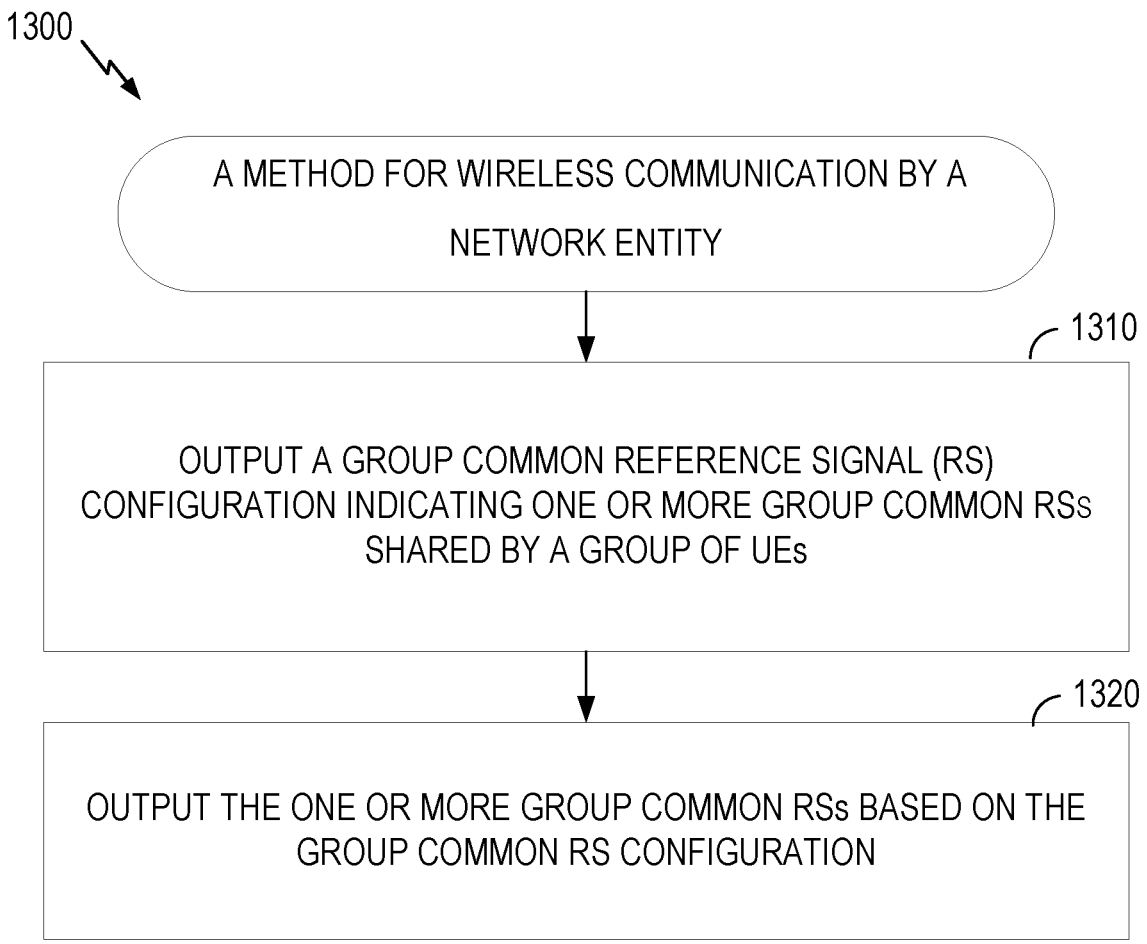
FIG. 13 is a flow diagram illustrating example operations for wireless communication by a base station.

FIG. 13 is a flow diagram illustrating example operations 1300 for wireless communication. Operations 1300 may be performed, for example, by a network entity (e.g., such as the BS 102 in the wireless communication network 100 of FIG. 1). Operations 1300 may be implemented as software components that are executed and run on one or more processors (e.g., controller/processor 240 of FIG. 2). Further, the transmission and reception of signals by the network entity in operations 1300 may be enabled, for example, by one or more antennas (e.g., antennas 234 of FIG. 2). In certain aspects, the transmission and/or reception of signals by the network entity may be implemented via a bus interface of one or more processors (e.g., controller/processor 240, including the GC BWP/RS component 241) obtaining and/or outputting signals.

Operations 1300 begin at 1310 with outputting a group common RS configuration. The group common RS configuration indicates one or more group common RSs shared by a group of UEs.

At block 1320, the network entity outputs the one or more group common RSs based on the group common RS configuration. The network entity may output the one or more group common RSs for transmission in a group common BWP. The one or more group common RSs may be one or more group common TRSs, one or more group common PRSs, one or more group common synchronization signals, one or more group common CSI-RRs, one or more group common RSSs, one or more group common sequence-based WUSs, or a combination thereof.

Example Wireless Communication Devices

Figure 14:
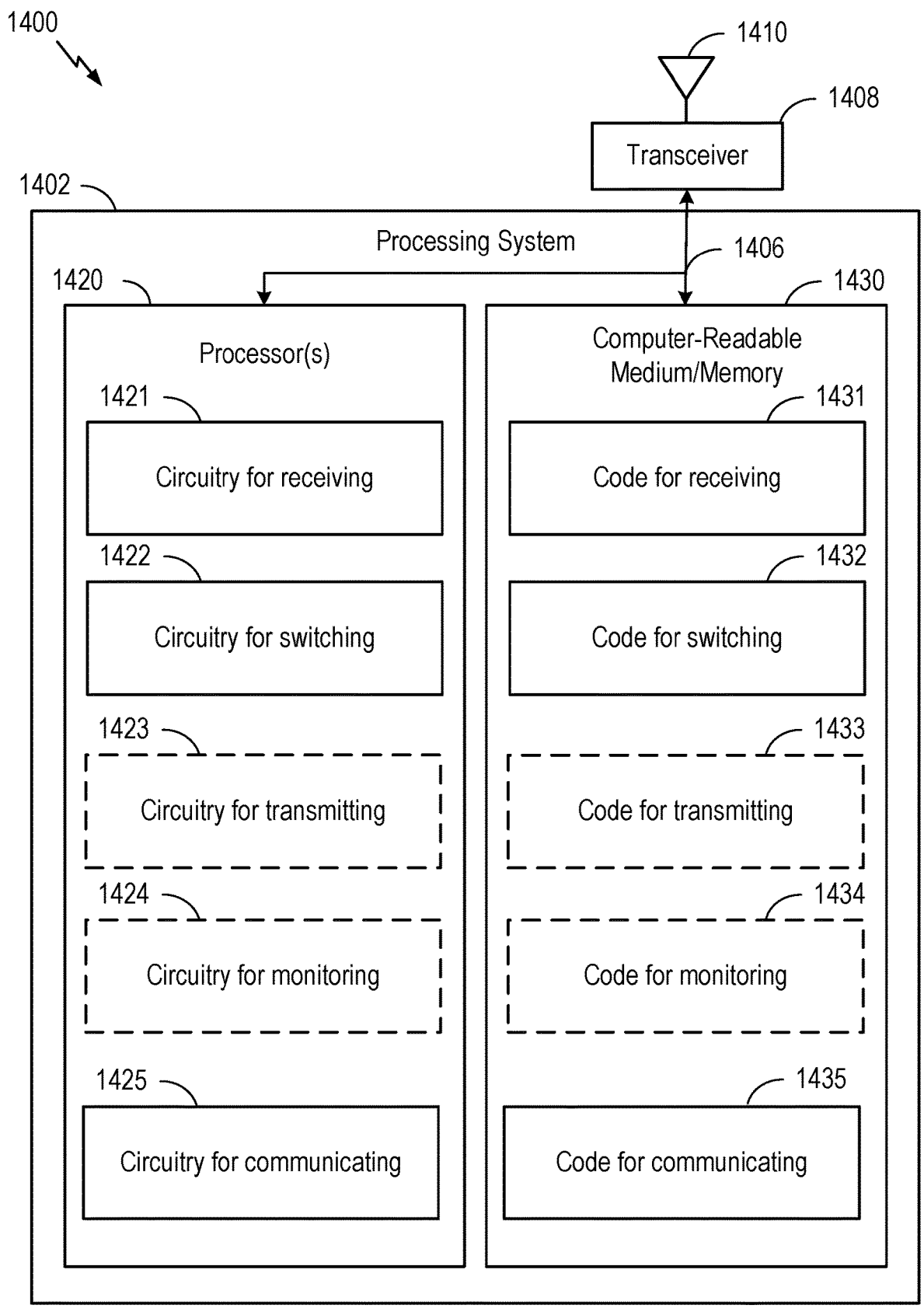
FIGS. 14 and 15 depict aspects of example communications devices.

FIG. 14 depicts an example communications device 1400 that includes various components operable, configured, or adapted to perform operations for the techniques disclosed herein, such as the operations depicted and described with respect to FIGS. 4, 5, 10, and 11. In some examples, communication device 1400 may be a user equipment 104 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1412, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIGS. 4, 5, 10, and 11, or other operations for performing the various techniques discussed herein for communicating using group common BWP and/or group common RSs.

In the depicted example, computer-readable medium/memory 1430 stores code 1431 for receiving, code 1432 for switching, code 1433 for transmitting, code 1434 for monitoring, and/or code 1435 for communicating.

In the depicted example, the one or more processors 1420 include circuitry configured to implement the code stored in the computer-readable medium/memory 1430, including circuitry 1421 for receiving, circuitry 1422 for switching, circuitry 1423 for transmitting, circuitry 1424 for monitoring, and/or circuitry 1425 for communicating.

Various components of communications device 1400 may provide means for performing the methods described herein, including with respect to FIGS. 4, 5, 10, and 11.

In some examples, means for communicating, means for transmitting, or means for sending (or means for outputting for transmission) may include transceivers 254 and/or antenna(s) 252 of user equipment 104 illustrated in FIG. 2 and/or transceiver 1408 and antenna 1410 of communication device 1400 in FIG. 14.

In some examples, means for communicating, means for receiving (or means for obtaining) may include transceivers 254 and/or antenna(s) 252 of user equipment 104 illustrated in FIG. 2 and/or transceiver 1408 and antenna 1410 of communication device 1400 in FIG. 14.

In some examples, means for switching (or means for obtaining) may include transceivers 254, antenna(s) 252, and/or controller/processor 280 of user equipment 104 illustrated in FIG. 2 and/or transceiver 1408, antenna 1410, and/or processor(s) 1420 of communication device 1400 in FIG. 14.

In some examples, means for monitoring (or means for obtaining) may include transceivers 254, antenna(s) 252, and/or controller/processor 280 of user equipment 104 illustrated in FIG. 2 and/or transceiver 1408, antenna 1410, and/or processor(s) 1420 of communication device 1400 in FIG. 14.

Notably, FIG. 14 is just one example, and many other examples and configurations of communication device 1400 are possible.

Figure 15:
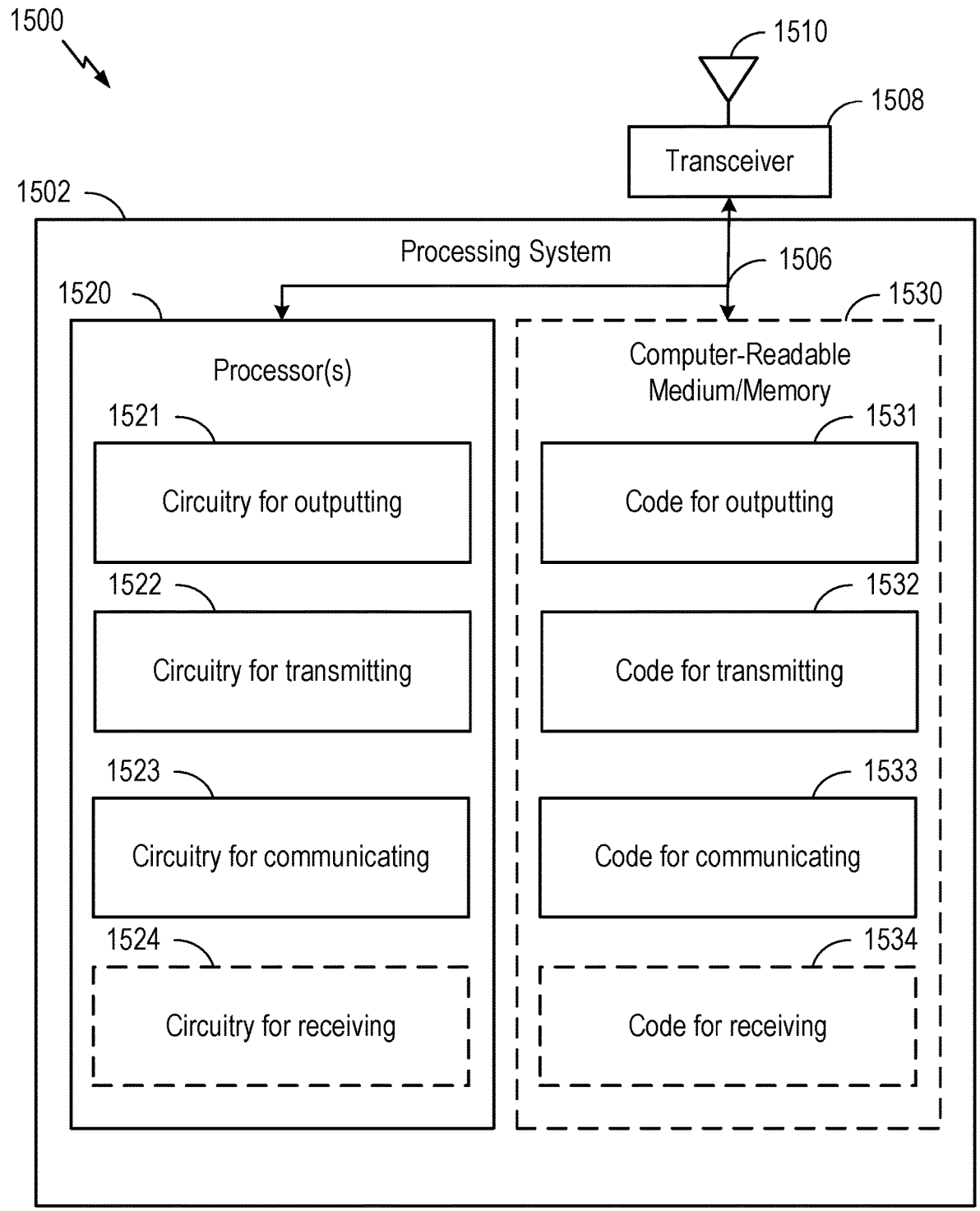

FIG. 15 depicts an example communications device 1500 that includes various components operable, configured, or adapted to perform operations for the techniques disclosed herein, such as the operations depicted and described with respect to FIGS. 6, 7, 12, and 13. In some examples, communication device 1500 may be a base station 102 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIGS. 6, 7, 12, and 13, or other operations for performing the various techniques discussed herein for power savings for reduced capability devices.

In the depicted example, computer-readable medium/memory 1530 stores code 1531 for outputting, code 1532 for transmitting, code 1533 for communicating, and code 1534 for receiving.

In the depicted example, the one or more processors 1520 include circuitry configured to implement the code stored in the computer-readable medium/memory 1530, including circuitry 1521 for outputting, circuitry 1522 for transmitting, circuitry 1523 for communicating, and circuitry 1524 for receiving.

Various components of communications device 1500 may provide means for performing the methods described herein, including with respect to FIGS. 6, 7, 12, and 13.

In some examples, means for transmitting or sending (or means for outputting for transmission) may include transceivers 232 and/or antenna(s) 234 of base station 102 illustrated in FIG. 2 and/or transceiver 1508 and antenna 1510 of communication device 1500 in FIG. 15.

In some examples, means for communicating may include transceivers 232 and/or antenna(s) 234 of base station 102 illustrated in FIG. 2 and/or transceiver 1508 and antenna 1510 of communication device 1500 in FIG. 15.

In some examples, means for receiving (or means for obtaining) may include transceivers 232 and/or antenna(s) 234 of base station illustrated in FIG. 2 and/or transceiver 1508 and antenna 1510 of communication device 1500 in FIG. 15.

Notably, FIG. 15 is just one example, and many other examples and configurations of communication device 1500 are possible.

EXAMPLE CLAUSES

Implementation examples are described in the following numbered clauses:

Clause 1. A method for wireless communications by a user equipment (UE), comprising: receiving, from a network entity, a group common bandwidth part (BWP) configuration indicating a group common BWP shared by a group of UEs including the UE; receiving signaling indicating a BWP switch to the group common BWP; and switching to the group common BWP based on the signaling.

Clause 2. The method of clause 1, wherein the group common BWP configuration is shared by the group of UEs based on one or more common capabilities of the UEs or a type of the UEs.

Clause 3. The method of any of clauses 1-2, wherein receiving the group common BWP configuration comprises receiving system information indicating the group common BWP configuration.

Clause 4. The method of clause 3, wherein receiving the group common BWP configuration comprises receiving at least a broadcast system information block Type 1 (SIB1) or other system information (OSI) indicating the configuration and switching procedures for one or multiple group common BWP.

Clause 5. The method of any of clauses 3-4, further comprising: transmitting a message requesting an on-demand system information block (SIB), wherein receiving the group common BWP configuration comprises receiving a broadcast on-demand SIB indicating the group common BWP configuration in response to the request.

Clause 6. The method of clause 5, wherein the message requesting the on-demand SIB is mapped to an uplink signal including physical random access channel (PRACH), physical uplink shared channel (PUSCH), physical uplink control channel (PUCCH), demodulation reference signal (DMRS), or sound reference signal (SRS), and wherein the on-demand SIB is received during or after initial access.

Clause 7. The method of any of clauses 1-6, further comprising: transmitting an initial access message or an uplink signal indicating one or more capabilities of the UE or a UE type, wherein receiving the group common BWP is based on the indicated one or more capabilities of the UE or a UE type indication.

Clause 8. The method of any of clauses 1-7, wherein receiving the group common BWP configuration comprises receiving the group common BWP configuration in a physical downlink shared channel (PDSCH) carrying random access response (RAR) message.

Clause 9. The method of any of clauses 1-8, wherein receiving the signaling indicating a BWP switch to the group common BWP comprises receiving a downlink control information (DCI), a medium access control control element (MAC CE), a timer configuration, or a radio resource control (RRC) message for BWP switching during or after an initial access procedure.

Clause 10. The method of clause 9, wherein receiving the signaling indicating a BWP switch to the group common BWP comprises receiving the signaling indicating the BWP switch in the DCI mapped to a physical downlink control channel (PDCCH) scheduling a physical downlink shared channel (PDSCH) random access message.

Clause 11. The method of any of clauses 9-10, wherein the indication of the BWP switch is in downlink control information (DCI) reserved bits, one or more unused fields in the DCI, one or more new fields in the DCI, a demodulation reference signal (DMRS) pattern of the PDCCH, cyclic redundancy bits (CRC) bits of the PDCCH payload, a scrambling identifier of the PDCCH, a dedicated CORESET of the PDCCH, or one or more search space sets of the PDCCH.

Clause 12. The method of any of clauses 9-10, wherein receiving the signaling indicating a BWP switch to the group common BWP comprises receiving the signaling indicating the BWP switch in a physical downlink shared channel (PDSCH) random access message, the MAC CE mapped to the PDSCH, the timer configuration mapped to the PDSCH, or the RRC message mapped to the PDSCH.

Clause 13. The method of any of clauses 1-12, wherein receiving the signaling indicating a BWP switch to the group common BWP comprises receiving the signaling indicating the BWP switch in a message after completing radio resource control (RRC) connection setup.

Clause 14. The method of clause 13, wherein receiving the signaling indicating a BWP switch to the group common BWP comprises receiving the signaling indicating the BWP switch in UE specific search space (USS) or common search space (CSS) physical downlink control channel (PDCCH).

Clause 15. The method of any of clauses 13-14, wherein receiving the signaling indicating a BWP switch to the group common BWP comprises receiving the signaling indicating the BWP switch in multicast or unicast physical downlink shared channel (PDSCH).

Clause 16. The method of any of clauses 1-15, further comprising: receiving a group common RS configuration for one or multiple RS types transmitted in the group common BWP and a measurement object configuration, wherein one or more measurement objects in the measurement object configuration includes one or more multiple RS types, and wherein the measurement object configuration is shared by the group of UEs; and monitoring one or more RSs in the group common BWP based on the group common RS configuration and the measurement objects configuration.

Clause 17. The method of clause 16, further comprising: receiving filtering parameters and combining procedures configured for one or multiple RS types used at least for time, phase, automatic gain control (AGC), and frequency tracking loops of the UE's transmitter and receiver, radio resource management (RRM) measurement, radio link monitoring (RLM) measurements, or a combination thereof; measuring, filtering, and combining one or multiple RS types based on the signaled parameters and combining procedures; applying the filtered one or multiple RS to the time, phase, AGC, and frequency tracking loops; generating an RRM measurement report or a RLM measurement report; and transmitting the RRM or RLM measurement report to the network entity.

Clause 18. The method of any of clauses 16-17, wherein monitoring the one or more group common RSs depends on whether the UE has a capability to monitor the one or more group common RSs and a frequency location of the one or more group common RSs.

Clause 19. The method of any of clauses 16-18, wherein monitoring the one or more group common RSs is based on whether the RS is configured for intra-frequency or inter-frequency measurement.

Clause 20. The method of any of clauses 1-19, further comprising: performing initial access with a base station (BS) using an initial BWP to establish a radio resource control (RRC) connection with the BS, wherein switching to the group common BWP comprises switching from the initial BWP to the group common BWP after establishing the RRC connection with the BS.

Clause 21. The method of any of clauses 1-20, wherein the group common BWP comprises a group common downlink BWP, a group common uplink BWP, or both.

Clause 22. A method for wireless communications by a user equipment (UE), comprising: receiving, from a network entity, a measurement object configuration and a group common reference signal (RS) configuration indicating one or more group common RSs shared by a group of UEs including the UE; and monitoring the one or more group common RSs based on the measurement object configuration and the group common RS configuration.

Clause 23. The method of clause 22, wherein the group common RS configuration, the measurement object configuration, or both is shared by the group of UEs based on one or more common capabilities of the UEs or a type of the UEs.

Clause 24. The method of any of clauses 22-23, wherein receiving the group common RS configuration comprises receiving system information, downlink control information (DCI), medium access control control element (MAC CE), or radio resource control (RRC) signaling indicating the group common RS configuration, and the group common RS transmission can be periodic or aperiodic.

Clause 25. The method of any of clauses 22-24, wherein the one or more group common RSs comprise a group common channel state information reference signal (CSI-RS), a group common tracking reference signal (TRS), a group common positioning reference signal (PRS), a group common secondary synchronization signal (SSS), a group common resynchronization signal (RSS), a group common sequence-based wake up signal (WUS), or a combination thereof.

Clause 26. The method of any of clauses 22-25, further comprising performing time tracking, phase tracking, frequency tracking, automatic gain control (AGC) tracking, or a combination thereof, based on the one or more group common RSs.

Clause 27. The method of any of clauses 22-26, further comprising waking up during DRX-ON duration of a discontinuous reception cycle (DRX) based on receiving one of the one or more group common RSs which are jointly configured with the DRX.

Clause 28. The method of any of clauses 22-27, further comprising performing radio resource management (RRM) measurements, radio link monitoring (RLM) measurements, or both on the one or more group common RSs during a DRX-ON duration of one or multiple discontinuous reception (DRX) cycles Clause 29. The method of any of clauses 22-28, wherein the one or more group common RSs are broadcast or multicast.

Clause 30. The method of any of clauses 22-29, wherein the one or more group common RSs are received periodically.

Clause 31. The method of any of clauses 22-30, wherein the one or more group common RSs are received aperiodically.

Clause 32. The method of any of clauses 22-31, wherein one or more resource sets for the one or more group common RSs are configured jointly with a connected discontinuous reception (CDRX) configuration for the UE.

Clause 33. The method of any of clauses 22-32, wherein one or more of the one or more group common RSs are configured with power boosting.

Clause 34. The method of any of clauses 22-33, wherein one or more of the one or more group common RSs are configured with filter coefficients, weighting coefficients, or both.

Clause 35. The method of any of clauses 22-34, wherein receiving the group common RS configuration comprises receiving a broadcast system information block Type 1 (SIB1) indicating the group common RS configuration.

Clause 36. The method of any of clauses 22-35, further comprising: sending a message requesting an on-demand system information block (SIB), wherein receiving the group common RS configuration comprises receiving a broadcast on-demand SIB indicating the group common RS configuration in response to the request.

Clause 37. The method of any of clauses 36, wherein the message requesting the on-demand SIB is mapped to an uplink signal including physical random access channel (PRACH), physical uplink shared channel (PUSCH), physical uplink control channel (PUCCH), demodulation reference signal (DMRS), or sound reference signal (SRS), and wherein the on-demand SIB is received during or after initial access.

Clause 38. The method of any of clauses 22-37, further comprising: transmitting an initial access message or an uplink signal indicating one or more capabilities of the UE or a UE type, wherein receiving the group common RS is based on the indicated one or more capabilities of the UE.

Clause 39. The method of any of clauses 22-38, further comprising receiving a group common bandwidth part (BWP) configuration indicating a group common BWP shared by a group of UEs including the UE, wherein monitoring the one or more group common RSs comprises monitoring the one or more group common RSs in the group common BWP.

Clause 40. The method of clause 39, wherein the group common RS configuration is configured when the group common BWP comprises a group common downlink BWP that does not contain a synchronization signal block (SSB) transmission or a control resource set zero (CORESET0) transmission.

Clause 41. The method of any of clauses 39-40, wherein a transmission schedule for the one or more group common RSs, a configuration of one or more resource sets for the one or more group common RSs, or both is signaled with the group common BWP configuration.

Clause 42. The method of any of clauses 39-41, wherein a transmission schedule for the one or more group common RSs, a configuration of one or more resource sets for the one or more group common RSs, or both is signaled separately from the group common BWP configuration.

Clause 43. A method for wireless communications by base station (BS), comprising: sending, to a user equipment (UE), a group common bandwidth part (BWP) configuration indicating a group common BWP shared by a group of UEs including the UE; sending signaling, to the UE, indicating a BWP switch to the group common BWP; and communicating with the UE in the group common BWP.

Clause 44. The method of clause 43, wherein the group common BWP configuration is shared by the group of UEs based on one or more common capabilities of the UEs or a type of the UEs.

Clause 45. The method of any of clauses 43-44, wherein sending the group common BWP configuration comprises sending system information indicating the group common BWP configuration.

Clause 46. The method of clause 45, wherein sending the group common BWP configuration comprises sending at least a broadcast system information block Type 1 (SIB1) or other system information (OSI) indicating the configuration and switching procedures for one or multiple group common BWP.

Clause 47. The method of any of clauses 45-46, further comprising: receiving a message requesting an on-demand system information block (SIB), wherein sending the group common BWP configuration comprises sending a broadcast on-demand SIB indicating the group common BWP configuration in response to the request.

Clause 48. The method of clause 47, wherein the message requesting the on-demand SIB is mapped to an uplink signal including physical random access channel (PRACH), physical uplink shared channel (PUSCH), physical uplink control channel (PUCCH), demodulation reference signal (DMRS), or sound reference signal (SRS), and wherein the on-demand SIB is sent during or after initial access.

Clause 49. The method of any of clauses 43-48, further comprising: receiving an initial access message or an uplink signal indicating one or more capabilities of the UE or a UE type, wherein sending the group common BWP is based on the indicated one or more capabilities of the UE.

Clause 50. The method of any of claims 43-49, wherein sending the group common BWP configuration comprises sending the group common BWP configuration in a physical downlink shared channel (PDSCH) random access message.

Clause 51. The method of any of clauses 43-50, wherein sending the signaling indicating a BWP switch to the group common BWP comprises sending the signaling indicating the BWP during an initial access procedure.

Clause 52. The method of clause 51, wherein sending the signaling indicating a BWP switch to the group common BWP comprises sending the signaling indicating the BWP switch in a physical downlink control channel (PDCCH) scheduling a physical downlink shared channel (PDSCH) random access message.

Clause 53. The method of any of clauses 51-52, wherein the indication of the BWP switch is in downlink control information (DCI) reserved bits, one or more unused fields in the DCI, one or more new fields in the DCI, a demodulation reference signal (DMRS) pattern of the PDCCH, cyclic redundancy bits (CRC) bits of the PDCCH payload, a scrambling identifier of the PDCCH, a dedicated control resource set (CORESET) of the PDCCH, or one or more search space sets of the PDCCH.

Clause 54. The method of any of clauses 43-53, wherein sending the signaling indicating a BWP switch to the group common BWP comprises sending the signaling indicating the BWP switch in a physical downlink shared channel (PDSCH) random access message.

Clause 55. The method of any of clauses 43-54, wherein sending the signaling indicating a BWP switch to the group common BWP comprises sending the signaling indicating the BWP switch in a message after completing radio resource control (RRC) connection setup.

Clause 56. The method of clause 55, wherein sending the signaling indicating a BWP switch to the group common BWP comprises sending the signaling indicating the BWP switch in user-specific search space (USS) or common search space (CSS) physical downlink control channel (PDCCH).

Clause 57. The method of any of clauses 55-56, wherein sending the signaling indicating a BWP switch to the group common BWP comprises sending the signaling indicating the BWP switch in multicast or unicast physical downlink shared channel (PD SCH).

Clause 58. The method of any of clauses 43-57, further comprising: sending a group common RS configuration for one or multiple RS types transmitted in the group common BWP; and sending one or more RSs in the group common BWP based on the group common RS configuration.

Clause 59. The method of clause 58, further comprising: sending filtering parameters and combining procedures configured for one or multiple RS types used for time, phase, automatic gain control (AGC), and frequency tracking loops of the UE's transmitter and receiver, radio resource management (RRM) measurement, radio link monitoring (RLM) measurements, or a combination thereof; and receiving an RRM or RLM measurement report from the UE.

Clause 60. The method of any of clauses 43-59, further comprising: performing initial access with a user equipment (UE) using an initial BWP to establish a radio resource control (RRC) connection with the UE, wherein communicating with the UE using the group common BWP comprises communicating with the UE using the group common BWP after establishing the RRC connection with the UE.

Clause 61. The method of any of clauses 43-60, wherein the group common BWP comprises a group common downlink BWP, a group common uplink BWP, or both.

Clause 62. A method for wireless communications by a base station (BS), comprising: sending, to a user equipment (UE), a measurement object configuration and a group common reference signal (RS) configuration indicating one or more group common RSs shared by a group of UEs including the UE; and transmitting the one or more group common RSs to the UE.

Clause 63. The method of clause 62, wherein the management object configuration, the group common RS configuration, or both is shared by the group of UEs based on one or more common capabilities of the UEs or a type of the UEs.

Clause 64. The method of any of clauses 62-63, wherein sending the group common RS configuration comprises sending system information indicating the group common RS configuration.

Clause 65. The method of any of clauses 62-64, wherein the one or more group common RSs comprise a group common channel state information reference signal (CSI-RS), a group common tracking reference signal (TRS), a group common positioning reference signal (PRS), a group common secondary synchronization signal (SSS), a group common resynchronization signal, a group common sequence-based wake up signal (WUS), or a combination thereof.

Clause 66. The method of any of clauses 62-65, wherein the one or more group common RSs are broadcast or multicast.

Clause 67. The method of any of clauses 62-66, wherein the one or more group common RSs are sent periodically.

Clause 68. The method of any of clauses 62-67, wherein the one or more group common RSs are sent aperiodically.

Clause 69. The method of any of clauses 62-68, wherein one or more resource sets for the one or more group common RSs are configured jointly with a connected discontinuous reception (CDRX) configuration for the UE.

Clause 70. The method of clause 62, wherein one or more of the one or more group common RSs are configured with power boosting.

Clause 71. The method of any of clauses 62-70, wherein one or more of the one or more group common RSs are configured with filter coefficients, weighting coefficients, or both.

Clause 72. The method of any of clauses 62-71, wherein sending the group common RS configuration comprises sending a broadcast system information block Type 1 (SIB1) indicating the group common RS configuration.

Clause 73. The method of any of clauses 62-72, further comprising: receiving a message requesting an on-demand system information block (SIB), wherein sending the group common RS configuration comprises sending a broadcast on-demand SIB indicating the group common RS configuration in response to the request.

Clause 74. The method of clause 73, wherein the message requesting the on-demand SIB is mapped to an uplink signal including physical random access channel (PRACH), physical uplink shared channel (PUSCH), physical uplink control channel (PUCCH), demodulation reference signal (DMRS), or sound reference signal (SRS), and wherein the on-demand SIB is sent during or after initial access.

Clause 75. The method of any of clauses 62-74, further comprising: receiving an initial access message or an uplink signal indicating one or more capabilities of the UE or a UE type, wherein sending the group common RS is based on the indicated one or more capabilities of the UE.

Clause 76. The method of any of clauses 62-75, further comprising sending a group common bandwidth part (BWP) configuration indicating a group common BWP shared by a group of UEs including the UE, wherein sending the one or more group common RSs comprises sending the one or more group common RSs in the group common BWP.

Clause 77. The method of clause 76, wherein the group common RS configuration is configured when the group common BWP comprises a group common downlink BWP that does not contain a synchronization signal block (SSB) transmission or a control resource set zero (CORESET0) transmission.

Clause 78. The method of any of clauses 76-77, wherein a transmission schedule for the one or more group common RSs, a configuration of one or more resource sets for the one or more group common RSs, or both is signaled with the group common BWP configuration.

Clause 79. The method of any of clauses 76-78, wherein a transmission schedule for the one or more group common RSs, a configuration of one or more resource sets for the one or more group common RSs, or both is signaled separately from the group common BWP configuration.

Clause 80. A method for wireless communications by a user equipment (UE), comprising: receiving a shared bandwidth part (BWP) configuration and a group common BWP configuration, wherein the group common BWP configuration indicates a group common BWP shared by a group of UEs, including the UE, having one or more common capabilities or a common UE type, wherein the shared BWP configuration indicates a shared BWP different than the group common BWP, and communicating using the group common BWP based on the group common BWP configuration.

Clause 81. The method of clause 80, wherein: the shared BWP configuration and the group common BWP configuration are received in a first BWP, the group common BWP is different than the first BWP, and the shared BWP is different than the first BWP.

Clause 82. The method of clause 81, wherein communicating using the group common BWP comprises switching from the first BWP to the group common BWP.

Clause 83. The method of any of clauses 80-82, wherein receiving the group common BWP configuration comprises receiving system information indicating the group common BWP configuration.

Clause 84. The method of any of clauses 80-83, wherein receiving the group common BWP configuration comprises receiving a broadcast system information block Type 1 (SIB1) or other system information (OSI) indicating the group common BWP configuration.

Clause 85. The method of any of clauses 80-84, further comprising: transmitting a message requesting an on-demand system information block (SIB), wherein receiving the group common BWP configuration comprises receiving a broadcast on-demand SIB indicating the group common BWP configuration after transmitting the message.

Clause 86. The method of clause 85, wherein: the message requesting the broadcast on-demand SIB comprises an physical random access channel (PRACH) transmission, a physical uplink shared channel (PUSCH) transmission, a physical uplink control channel (PUCCH) transmission, a demodulation reference signal (DMRS), or a sound reference signal (SRS); and the broadcast on-demand SIB is received during or after initial access.

Clause 87. The method of any of clauses 80-86, further comprising: transmitting an initial access message indicating one or more capabilities of the UE or a UE type.

Clause 88. The method of any of clauses 80-87, further comprising: receiving signaling indicating to switch to the group common BWP; and switching to the group common BWP from a first BWP based on the signaling indicating to switch to the group common BWP.

Clause 89. The method of clause 88, wherein the signaling indicating to switch to the group common BWP comprises: one or more reserved bits in downlink control information (DCI) in a physical downlink control channel (PDCCH); one or more fields in the DCI; a demodulation reference signal (DMRS) pattern of the PDCCH; cyclic redundancy check (CRC) bits of a payload of the PDCCH carrying the DCI; a scrambling identifier of the PDCCH carrying the DCI; a dedicated control resource set (CORESET) associated with the PDCCH carrying the DCI; or one or more search space sets of the PDCCH carrying the DCI.

Clause 90. The method of clause 89, wherein the PDCCH is received in a UE specific search space (USS) or common search space (CSS).

Clause 91. The method of clause 88, wherein the signaling indicating to switch to the group common BWP comprises a medium access control control element (MAC CE), a timer configuration, or a radio resource control (RRC) message.

Clause 92. The method of clause 91, wherein the signaling indicating to switch to the group common BWP comprises a physical downlink shared channel (PDSCH) random access message carrying the MAC CE, the timer configuration, or the RRC message.

Clause 93. The method of clause 92, wherein the PDSCH random access message is multicast or unicast.

Clause 94. The method of any of clauses 80-93, wherein the group common BWP comprises a group common downlink BWP or a group common uplink BWP.

Clause 95. The method of any of clauses 80-94, further comprising: performing initial access with a base station (BS), using a first BWP, to establish a radio resource control (RRC) connection with the BS; and switching from the first BWP to the group common BWP after establishing the RRC connection with the BS.

Clause 96. The method of any of clauses 80-95, wherein the group common BWP comprises a group common downlink BWP that does not contain a synchronization signal block (SSB) transmission or a control resource set zero (CORESET0).

Clause 97. The method of any of clauses 80-96, wherein the group of UEs comprises reduced capability (RedCap) UEs.

Clause 98. The method of any of clauses 80-97, further comprising: receiving a group common reference signal (RS) configuration, wherein the group common RS configuration indicates one or more group common RSs shared by the group of UEs; and monitoring the one or more group common RSs based on the group common RS configuration.

Clause 99. The method of clause 98, wherein monitoring the one or more group common RSs comprises monitoring the one or more group common RSs in the group common BWP.

Clause 100. The method of clause 98, wherein the one or more group common RSs comprise one or more group common tracking reference signals (TRSs).

Clause 100. The method of any of clauses 98-99, wherein the one or more group common RSs comprise one or more group common positioning reference signals (PRSs).

Clause 101. The method of any of clauses 98-100, wherein the one or more group common RSs comprise one or more group common channel state information reference signals (CSI-RS).

Clause 102. The method any of clauses 98-101, wherein the one or more group common RSs comprise one or more group common synchronization signals.

Clause 103. The method of any of clauses 98-102, wherein the one or more group common RSs comprise one or more group common resynchronization signals (RSSs), one or more group common sequence-based wake up signals (WUSs), or a combination thereof.

Clause 104. The method any of clauses 98-103, wherein receiving the group common RS configuration comprises receiving the group common RS configuration in system information.

Clause 105. The method of any of clauses 98-103, further comprising: waking up during an ON duration of a discontinuous reception cycle (DRX) based on receiving one of the one or more group common RSs; and performing measurements on one or more of the one or more group common RSs during the ON duration, wherein the measurements include radio resource management (RRM) measurements, radio link monitoring (RLM) measurements, or both the RRM measurements and the RLM measurements.

Clause 106. The method of any of clauses 80-105, wherein at least one of the one or more group common RSs is configured with power boosting.

Clause 107. A method for wireless communications by a user equipment (UE), comprising: receiving a group common reference signal (RS) configuration, wherein the group common RS configuration indicates one or more group common RSs shared by a group of UEs including the UE; and monitoring the one or more group common RSs based on the group common RS configuration.

Clause 108. The method of clause 107, wherein monitoring the one or more group common RSs comprises monitoring the one or more group common RSs in a group common bandwidth part (BWP).

Clause 109. The method of any of clauses 107-108, wherein the one or more group common RSs comprise one or more group common tracking reference signals (TRSs).

Clause 110. The method of any of clauses 107-109, wherein the one or more group common RSs comprise one or more group common positioning reference signals (PRSs).

Clause 111. The method of any of clauses 107-110, wherein the one or more group common RSs comprise one or more group common synchronization signals.

Clause 112. The method of any of clauses 107-111, wherein the one or more group common RSs comprise one or more group common channel state information reference signals (CSI-RS).

Clause 113. The method of any of clauses 107-112, wherein the one or more group common RSs comprise one or more group common resynchronization signals (RSSs), one or more group common sequence-based wake up signals (WUSs), or a combination thereof.

Clause 114. The method of any of clauses 107-113, further comprising determining whether to monitor the one or more group common RSs based on a capability of the UE to monitor the one or more group common RSs, wherein the monitoring is further based on the determination.

Clause 115. The method of The method of any of clauses 107-114, further comprising performing intra-frequency measurements of the one or more group common RSs.

Clause 116. The method of any of clauses 107-115, further comprising performing inter-frequency measurements of the one or more group common RSs.

Clause 117. The method of any of clauses 107-116, wherein receiving the group common RS configuration comprises receiving the group common RS configuration in system information.

Clause 118. The method of any of clauses 107-117, wherein receiving the group common RS configuration comprises receiving the group common RS configuration in downlink control information (DCI), a medium access control (MAC) control element (CE), or radio resource control (RRC) signaling.

Clause 119. The method of any of clauses 107-118, further comprising: waking up during an ON duration of a discontinuous reception cycle (DRX) based on receiving one of the one or more group common RSs; and performing measurements on one or more of the one or more group common RSs during the ON duration, wherein the measurements include radio resource management (RRM) measurements, radio link monitoring (RLM) measurements, or both the RRM measurements and the RLM measurements.

Clause 120. The method of any of clauses 107-119, wherein the one or more group common RSs are broadcast or multicast.

Clause 121. The method of any of clauses 107-120, wherein at least one of the one or more group common RSs is configured with power boosting.

Clause 122. A method for wireless communications by a network entity, comprising: outputting a group common reference signal (RS) configuration, wherein the group common RS configuration indicates one or more group common RSs shared by one or more group of user equipments (UEs); and outputting the one or more group common RSs based on the group common RS configuration.

Clause 123. The method of clause 122, wherein the one or more group common RSs are output for transmission in a group common bandwidth part (BWP).

Clause 124. The method of any of clauses 122-123, wherein the one or more group common RSs comprise one or more group common tracking reference signals (TRSs).

Clause 125. The method of any of clauses 122-124, wherein the one or more group common RSs comprise one or more group common positioning reference signals (PRSs).

Clause 126. The method of any of clauses 122-125, wherein the one or more group common RSs comprise one or more group common synchronization signals.

Clause 127. The method of any of clauses 122-126, wherein the one or more group common RSs comprise one or more group common channel state information reference signals (CSI-RS).

Clause 128. The method of any of clauses 122-127, wherein the one or more group common RSs comprise one or more group common resynchronization signals (RSSs), one or more group common sequence-based wake up signals (WUSs), or a combination thereof.

Clause 129. The method of any of clauses 122-128, wherein the group common RS configuration is output for transmission in system information.

Clause 130. The method of any of clauses 122-129, wherein the group common RS configuration is output in downlink control information (DCI), a medium access control (MAC) control element (CE), or radio resource control (RRC) signaling.

Clause 131. The method of any of clauses 122-130, further comprising: aligning the one or more group common RSs with an ON duration of a discontinuous reception cycle (DRX) of one or more UEs of the group of UEs.

Clause 132. The method of any of clauses 122-131, wherein the one or more group common RSs are broadcast or multicast.

Clause 133. The method of any of clauses 122-132, wherein at least one of the one or more group common RSs is configured with power boosting.

Clause 134: An apparatus, comprising: a memory comprising executable instructions; one or more processors configured to execute the executable instructions and cause the apparatus to perform a method in accordance with any one of Clauses 1-133.

Clause 135: An apparatus, comprising means for performing a method in accordance with any one of Clauses 1-133.

Clause 136: A non-transitory computer-readable medium comprising executable instructions that, when executed by one or more processors of an apparatus, cause the apparatus to perform a method in accordance with any one of Clauses 1-133.

Clause 137: A computer program product embodied on a computer-readable storage medium comprising code for performing a method in accordance with any one of Clauses 1-135.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as eMBB, mmWave, MTC, and/or mission critical targeting URLLC. These services, and others, may include latency and reliability requirements.

Returning to FIG. 1, various aspects of the present disclosure may be performed within the example wireless communications network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as mmWave base station 180 may operate in a traditional sub-6 GHz spectrum, in millimeter wave (mmWave) frequencies, and/or near mmWave frequencies in communication with the UE 104. When the mmWave base station 180 operates in mmWave or near mmWave frequencies, the mmWave base station 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration. For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of power savings for reduced capability devices in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
    receiving a group common reference signal (RS) configuration, wherein the group common RS configuration indicates one or more group common RSs shared by a group of UEs including the UE, and wherein the one or more group common RSs comprise one or more group common tracking reference signals (TRSs); and
    monitoring the one or more group common RSs based on the group common RS configuration.

2. The method of claim 1, wherein monitoring the one or more group common RSs comprises monitoring the one or more group common RSs in a group common bandwidth part (BWP).

3. The method of claim 1, wherein the one or more group common RSs comprise one or more group common positioning reference signals (PRSs).

4. The method of claim 1, wherein the one or more group common RSs comprise one or more group common synchronization signals.

5. The method of claim 1, wherein the one or more group common RSs comprise one or more group common channel state information reference signals (CSI-RS).

6. The method of claim 1, wherein the one or more group common RSs comprise one or more group common resynchronization signals (RSSs), one or more group common sequence-based wake up signals (WUSs), or a combination thereof.

7. The method of claim 1, further comprising:
    determining, based on a capability of the UE, whether to monitor the one or more group common RSs,
    wherein the monitoring is further based on the determination.

8. The method of claim 1, further comprising performing one or more intra-frequency measurements on the one or more group common RSs.

9. The method of claim 1, further comprising performing one or more inter-frequency measurements on the one or more group common RSs.

10. The method of claim 1, wherein receiving the group common RS configuration comprises receiving the group common RS configuration in system information.

11. The method of claim 1, wherein receiving the group common RS configuration comprises receiving the group common RS configuration in downlink control information (DCI), a medium access control (MAC) control element (CE), or radio resource control (RRC) signaling.

12. The method of claim 1, further comprising:
    waking up, during an ON duration of a discontinuous reception (DRX) cycle, in response to receiving a first group common RS of the one or more group common RSs; and
    performing one or more measurements, during the ON duration, on one or more second group common RSs of the one or more group common RSs,
    wherein the one or more measurements include one or more radio resource management (RRM) measurements, one or more radio link monitoring (RLM) measurements, or both the one or more RRM measurements and the one or more RLM measurements.

13. The method of claim 1, wherein the one or more group common RSs are broadcast or multicast.

14. The method of claim 1, wherein at least one of the one or more group common RSs is configured with power boosting.

15. The method of claim 1, wherein the group of UEs comprise reduced capability (RedCap) UEs.

16. A method for wireless communications by a network entity, comprising:
    outputting a group common reference signal (RS) configuration, wherein the group common RS configuration indicates one or more group common RSs shared by a group of user equipments (UEs), and wherein the one or more group common RSs comprise one or more group common tracking reference signals (TRSs); and
    outputting the one or more group common RSs based on the group common RS configuration.

17. The method of claim 16, wherein outputting the one or more group common RSs comprises outputting the one or more group common RSs for transmission in a group common bandwidth part (BWP).

18. The method of claim 16, wherein the one or more group common RSs comprise one or more group common positioning reference signals (PRSs).

19. The method of claim 16, wherein the one or more group common RSs comprise one or more group common synchronization signals.

20. The method of claim 16, wherein the one or more group common RSs comprise one or more group common channel state information reference signals (CSI-RS).

21. The method of claim 16, wherein the one or more group common RSs comprise one or more group common resynchronization signals (RSSs), one or more group common sequence-based wake up signals (WUSs), or a combination thereof.

22. The method of claim 16, further comprising receiving an intra-frequency measurement report of the one or more group common RSs.

23. The method of claim 16, further comprising receiving an inter-frequency measurement report of the one or more group common RSs.

24. The method of claim 16, wherein outputting the group common RS configuration comprises outputting the group common RS configuration for transmission in system information.

25. The method of claim 16, wherein outputting the group common RS configuration comprises outputting the group common RS configuration for transmission in downlink control information (DCI), a medium access control (MAC) control element (CE), or radio resource control (RRC) signaling.

26. The method of claim 16, further comprising:
    scheduling a first group common RS of the one or more group common RSs to wake up one or more UEs before a first ON duration of a first discontinuous reception (DRX) cycle of a first group of one or more UEs and during a second ON duration of a second DRX cycle of a second group of one or more UEs for measurement by the second group of one or more UEs.

27. The method of claim 16, wherein outputting the one or more group common RSs comprises outputting the one or more group common RSs for broadcast transmission or multicast transmission.

28. The method of claim 16, wherein outputting the one or more group common RSs comprises outputting at least one of the one or more group common RSs for transmission with power boosting.

29. A user equipment (UE) configured for wireless communications, comprising:
    one or more memories comprising computer-executable instructions; and
    one or more processors configured to execute the computer-executable instructions and cause the UE to:
        receive a group common reference signal (RS) configuration, wherein the group common RS configuration indicates one or more group common RSs shared by a group of UEs including the UE, and wherein the one or more group common RSs comprise one or more group common tracking reference signals (TRSs); and
        monitor the one or more group common RSs based on the group common RS configuration.

30. The UE of claim 29, wherein, to monitor the one or more group common RSs, the one or more processors are configured to execute the computer-executable instructions and cause the UE to monitor the one or more group common RSs in a group common bandwidth part (BWP).

31. The UE of claim 29, wherein the one or more group common RSs comprise one or more group common positioning reference signals (PRSs).

32. The UE of claim 29, wherein the one or more group common RSs comprise one or more group common synchronization signals.

33. The UE of claim 29, wherein the one or more group common RSs comprise one or more group common channel state information reference signals (CSI-RS).

34. The UE of claim 29, wherein the one or more group common RSs comprise one or more group common resynchronization signals (RSSs), one or more group common sequence-based wake up signals (WUSs), or a combination thereof.

35. The UE of claim 29, wherein the one or more processors are configured to execute the computer-executable instructions and cause the UE to:
    determine, based on a capability of the UE, whether to monitor the one or more group common RSs; and
    monitor the one or more group common RSs based on a determination as to whether to monitor the one or more group common RSs.

36. The UE of claim 29, wherein the one or more processors are configured to execute the computer-executable instructions and cause the UE to perform one or more intra-frequency measurements on the one or more group common RSs.

37. The UE of claim 29, wherein the one or more processors are configured to execute the computer-executable instructions and cause the UE to perform one or more inter-frequency measurements on the one or more group common RSs.

38. The UE of claim 29, wherein to receive the group common RS configuration, the one or more processors are configured to execute the computer-executable instructions and cause the UE to receive the group common RS configuration in system information.

39. The UE of claim 29, wherein to receive the group common RS configuration, the one or more processors are configured to execute the computer-executable instructions and cause the UE to receive the group common RS configuration in downlink control information (DCI), a medium access control (MAC) control element (CE), or radio resource control (RRC) signaling.

40. The UE of claim 29, wherein the one or more processors are configured to execute the computer-executable instructions and cause the UE to:

wake up, during an ON duration of a discontinuous reception (DRX) cycle, in response to receiving a first group common RS of the one or more group common RSs; and perform one or more measurements, during the ON duration, on one or more second group common RSs of the one or more group common RSs, wherein the one or more measurements include one or more radio resource management (RRM) measurements, one or more radio link monitoring (RLM) measurements, or both the one or more RRM measurements and the one or more RLM measurements.

41. The UE of claim 29, wherein the one or more group common RSs are broadcast or multicast.

42. The UE of claim 29, wherein at least one of the one or more group common RSs is configured with power boosting.

43. The UE of claim 29, wherein the group of UEs comprise reduced capability (RedCap) UEs.

44. A network entity, comprising:
one or more memories comprising computer-executable instructions; and
one or more processors configured to execute the computer-executable instructions and cause the network entity to:
output a group common reference signal (RS) configuration, wherein the group common RS configuration indicates one or more group common RSs shared by a group of user equipments (UEs), and wherein the one or more group common RSs comprise one or more group common tracking reference signals (TRSs); and
output the one or more group common RSs based on the group common RS configuration.

45. The network entity of claim 44, wherein to output the one or more group common RSs, the one or more processors are configured to execute the computer-executable instructions and cause the UE to output the one or more group common RSs for transmission in a group common bandwidth part (BWP).

46. The network entity of claim 44, wherein the one or more group common RSs comprise one or more group common positioning reference signals (PRSs).

47. The network entity of claim 44, wherein the one or more group common RSs comprise one or more group common synchronization signals.

48. The network entity of claim 44, wherein the one or more group common RSs comprise one or more group common channel state information reference signals (CSI-RS).

49. The network entity of claim 44, wherein the one or more group common RSs comprise one or more group common resynchronization signals (RSSs), one or more group common sequence-based wake up signals (WUSs), or a combination thereof.

50. The network entity of claim 44, wherein the one or more processors are configured to execute the computer-executable instructions and cause the UE to receive an intra-frequency measurement report of the one or more group common RSs.

51. The network entity of claim 44, wherein the one or more processors are configured to execute the computer-executable instructions and cause the UE to receive an inter-frequency measurement report of the one or more group common RSs.

52. The network entity of claim 44, wherein to output the group common RS configuration, the one or more processors are configured to execute the computer-executable instructions and cause the UE to output the group common RS configuration for transmission in system information.

53. The network entity of claim 44, wherein to output the group common RS configuration, the one or more processors are configured to execute the computer-executable instructions and cause the UE to output the group common RS configuration for transmission in downlink control information (DCI), a medium access control (MAC) control element (CE), or radio resource control (RRC) signaling.

54. The network entity of claim 44, wherein the one or more processors are configured to execute the computer-executable instructions and cause the UE to:
schedule a first group common RS of the one or more group common RSs to wake up one or more UEs before a first ON duration of a first discontinuous reception (DRX) cycle of a first group of one or more UEs and during a second ON duration of a second DRX cycle of a second group of one or more UEs for measurement by the second group of one or more UEs.

55. The network entity of claim 44, wherein to output the one or more group common RSs, the one or more processors are configured to execute the computer-executable instructions and cause the UE to output the one or more group common RSs for broadcast transmission or multicast transmission.

56. The network entity of claim 44, wherein to output the one or more group common RSs, the one or more processors are configured to execute the computer-executable instructions and cause the UE to output at least one of the one or more group common RSs for transmission with power boosting.

* * * * *